(12) United States Patent
Yodoshi

(10) Patent No.: US 6,230,070 B1
(45) Date of Patent: May 8, 2001

(54) WORK POSITION ADJUSTING APPARATUS AND ADJUSTING METHOD

(75) Inventor: Tatsuo Yodoshi, Kashihara (JP)

(73) Assignee: Fuji Seiki Co., Ltd. (JP)

( * ) Notice: Subject to any disclaimer, the term of this patent is extended or adjusted under 35 U.S.C. 154(b) by 0 days.

(21) Appl. No.: 09/038,538

(22) Filed: Mar. 11, 1998

(30) Foreign Application Priority Data

Jul. 23, 1997 (JP) .................................................. 9-197265

(51) Int. Cl.[7] .................................................. B24B 49/10
(52) U.S. Cl. .................................................. 700/162
(58) Field of Search .................................. 700/162, 160, 700/186, 192, 193, 194; 451/10, 5, 26

(56) References Cited

U.S. PATENT DOCUMENTS

| | | | |
|---|---|---|---|
| 4,602,459 | * | 7/1986 | Drits et al. .................... 51/165.77 |
| 4,602,540 | * | 7/1986 | Murofushi et al. ................. 82/2 B |
| 5,558,557 | * | 9/1996 | Dashevsky ........................... 451/10 |

* cited by examiner

Primary Examiner—Robert W. Beausoliel, Jr.
Assistant Examiner—Bryce Bonzo
(74) Attorney, Agent, or Firm—Rabin & Champagne, P.C.

(57) ABSTRACT

An apparatus for adjusting the position of a work mounted on a machine tool. A base is fixed to a work table of the machine tool, and the position of a mounting member is adjusted with respect to the base. The work is mounted on a mounting surface of the mounting member. The positions in the Z-axis direction of central portions of the four sides of the mounting member are adjusted by first driving and fixing members so that a work surface of the work is along an X-Y plane. The position where the mounting member is rotated around the Z-axis is then adjusted by second driving and fixing members arranged in the central portions of the pair of opposite sides of the mounting member so that a plane of the work is parallel to an X-Z plane. Each of the driving and fixing members includes piezoelectric displacement elements for adjusting an amount of displacement in response to an applied voltage so as to fix the mounting member in a state where the amount of displacement is adjusted.

24 Claims, 22 Drawing Sheets

F I G. 2
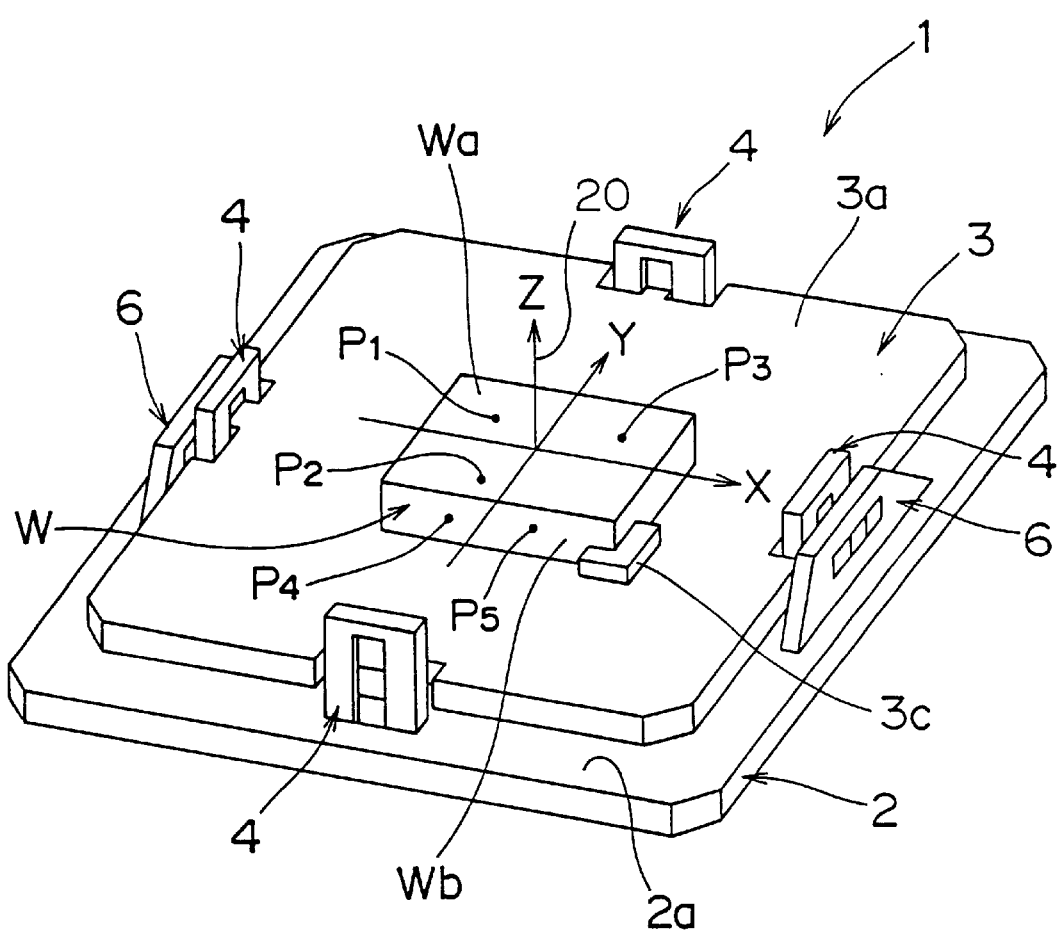

F I G. 3
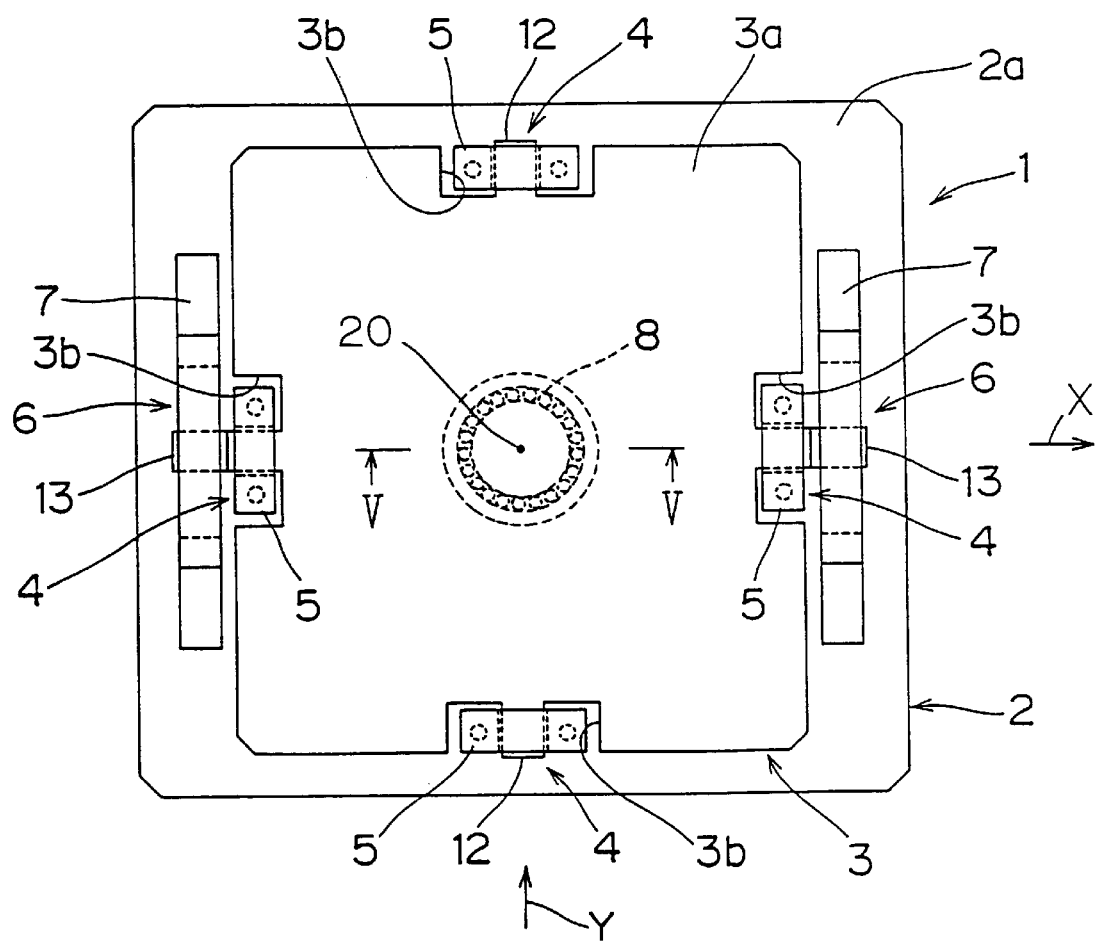

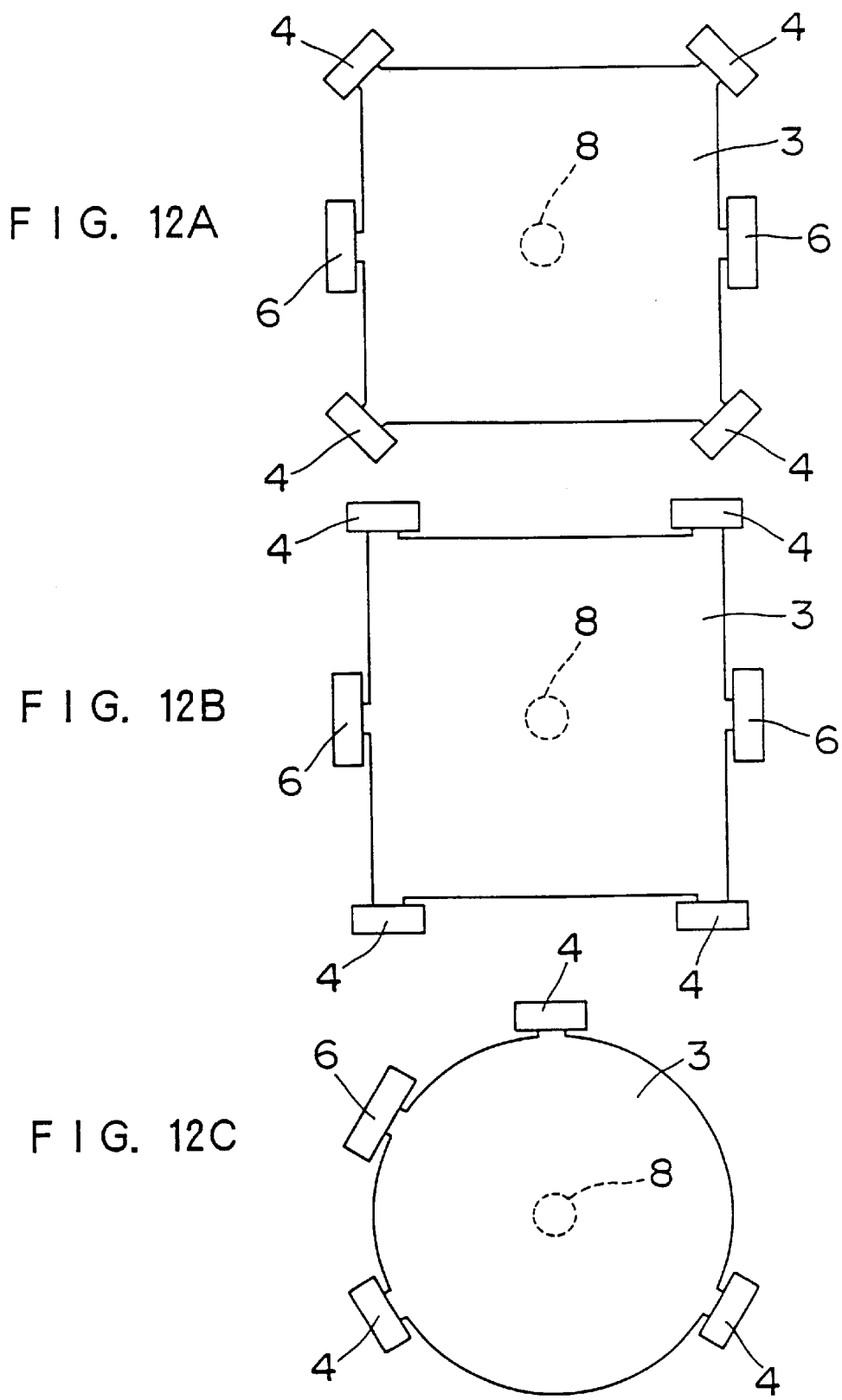

F I G. 18
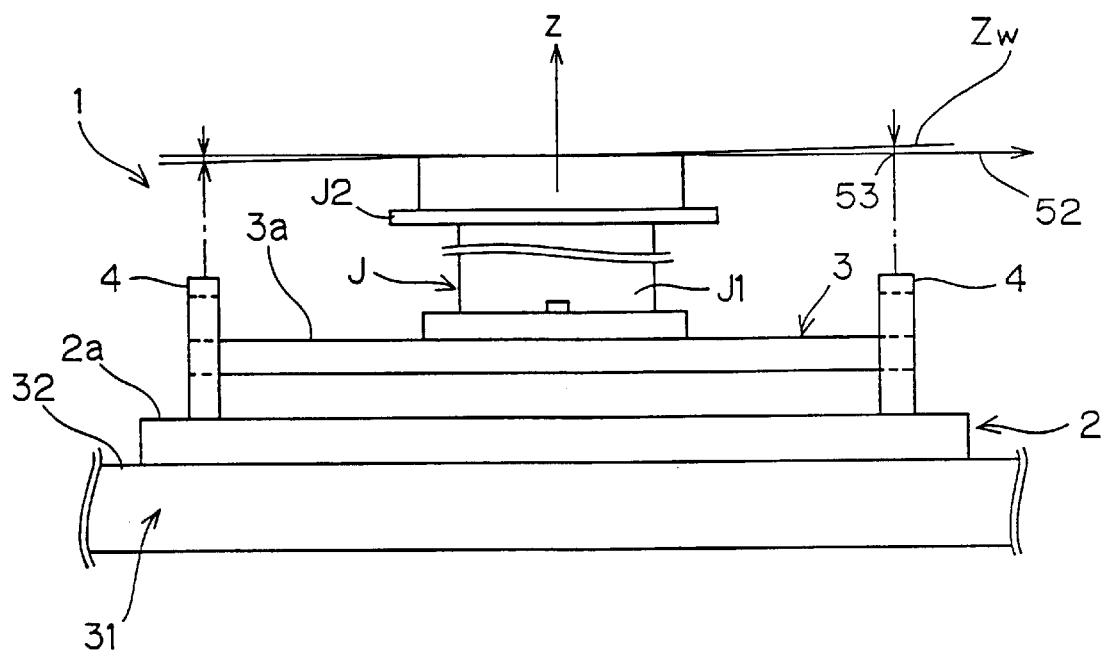

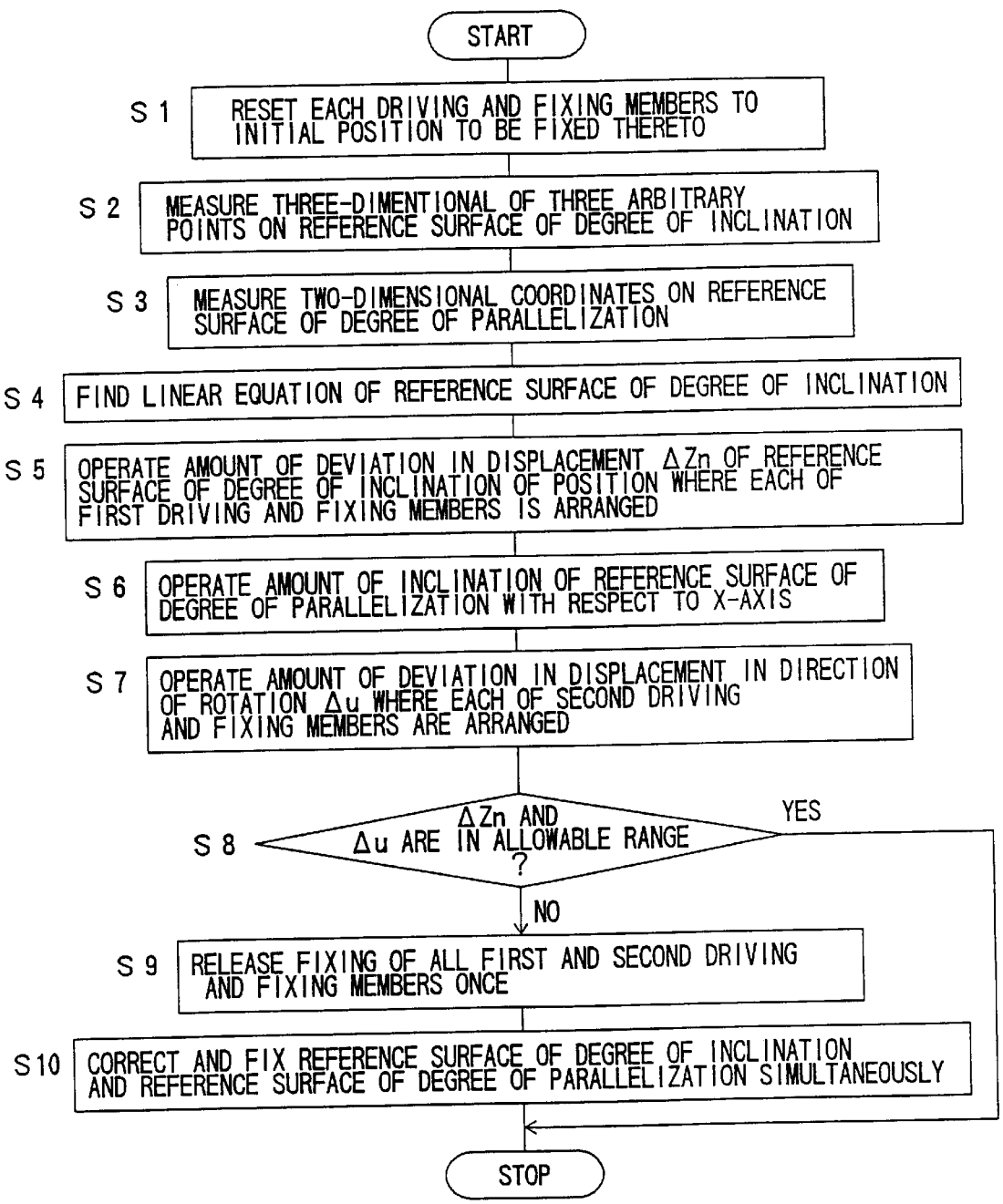
F I G. 20

WORK POSITION ADJUSTING APPARATUS AND ADJUSTING METHOD

CROSS REFERENCE TO RELATED APPLICATION

This application claims priority benefits under 35 USC §119 of Japanese Patent Application Serial No. 9-197265 filed on Jul. 23, 1997, the disclosure of which is incorporated by reference.

BACKGROUND OF THE INVENTION

1. Field of the Invention

The present invention relates to a work position adjusting apparatus and a work position adjusting method for correcting an error in inclination of a work surface of a work, for example, and an error in rotation along the work surface on a work table of a machine tool.

2. Description of Related Arts

Referring to FIGS. 21 and 22, reference numeral 30 denotes a machine tool such as an NC milling machine. Reference numeral 31 denotes a work table on which a work is carried. An upper surface 32 of the work table 31 is basically parallel to an X-Y motion plane (hereinafter merely referred to as an X-Y plane) of a machine. In the case of FIG. 21, the work table 31 is movable upon being guided by an X-axis guide rail 37 and a Y-axis guide rail 38 on the X-Y plane of the machine. A work 33 is carried and fixed on the upper surface 32 of the work table 31 directly or through a work supporting device 34 such as a vice. A cutting tool 35 is mounted on a spindle and is rotated around a pindle center M to cut the work 33.

Referring to FIG. 22, at the time of working, a work surface 39 of the work 33 must be set in a correct positional relationship with the X-Y plane of the machine. In order to simplify the description, a case where the work surface 39 of the work 33 should be parallel to the X-Y plane will be hereafter premised. In this case, in such working that precision on the order of microns is required, the work surface 39 is not always completely parallel to the X-Y plane only by merely mounting the work 33 directly or through the work supporting device 34.

Specifically, the work surface 39 is not always completely parallel to the X-Y plane by accumulating various errors such as an error in inclination of a surface of the work table 31 itself and an error caused by the work supporting device 34, and generally, has an error in inclination on the order of microns (an error in the degree of parallelization). The work 33 has an error in rotation around an axis perpendicular to the X-Y plane. In either case, it is preferable that the error in inclination and the error in rotation are brought as close to zero as possible.

In the prior art, the error in inclination of the work surface 39 is measured prior to the working, and then the inclination is adjusted by lightly tapping a part of the work surface 39 of the work 33 or spreading a thin metal foil between a part of the bottom of the work 33 and a base metal 40, for example. The error in inclination on the order of microns is brought close to zero by repeating such operations of measuring and correcting the error.

The error in the degree of parallelization related to the above-mentioned error in rotation is measured, and is measured again after slightly loosening a bolt 41 for mounting the work supporting device 34 on the work table 31 and lightly tapping a side part of the work supporting device 34, thereby finely adjusting the degree of parallelization of the work supporting device 34. The error in the degree of parallelization on the order of microns is brought close to zero by repeating such an operation as mentioned above.

The operations are very troublesome, and the efficiency of the operations significantly depends on the skill of a worker.

Furthermore, human intervention is always required for the operations, which presents a large problem in the case of unmanned automation of the working including a set-up operation such as replacement of the work and fine adjustment of the inclination and the degree of parallelization.

SUMMARY OF THE INVENTION

An object of the present invention is to provide a work position adjusting apparatus and a work position adjusting method for adjusting the position of a work with high precision simply and in a short time without depending on the skill of a worker, which method is adapted to cope as required with unmanned automation.

In order to attain the above-mentioned object, in one mode of the present invention, a work position adjusting apparatus for adjusting the position of a work having first and second surfaces crossing each other, on the basis of mutually perpendicular first, second and third axes are set in a machine tool with respect to a relative motion between a tool head and a work table, comprises a base, a mounting member on which the work is mounted, and supporting means interposed between the base and the mounting member for supporting the mounting member. The supporting means comprises first correcting means for correcting the inclination of the first surface relative to a plane including the first and second axes, by driving the mounting member in a direction parallel to the third axis, and second correcting means for correcting the inclination of the second surface relative to the first axis by rotating the mounting member around an axis parallel to the third axis. The work position adjusting apparatus further comprises coordinate value detecting means for detecting coordinate values related to the inclination of the first surface relative to the plane including the first and second axes and a coordinate value inclination of the second surface relative to the first axis, and controlling means for controlling the operation of each of the correcting means in response to a signal from the coordinate value detecting means.

In the present embodiment, it is possible to detect the coordinate values related to the inclinations of the first and second surfaces of the work, control the operation of each of the correcting means depending on the detected coordinate values, and automatically correct the work to a desired mounting position. Further, the surface of the work is corrected on the basis of a motion axis of the machine tool, so that the correction can be made with high precision without being affected by an error in mounting between the base and the work table.

The correction of the inclination of the first surface relative to the plane including the first and second axes, means the correction is to assure that an angle between both the plane and the first surface is a required angle. The required angle includes zero (that is, a case where both the surfaces are parallel to each other). Further, the correction according to the invention could be a case where the angle is so corrected as to fall within an allowable range including the required range, or a case where it is strictly corrected to the required angle. The same are true for the correction of the inclination of the second surface of the work. When the machine tool is an electric discharge machine, an electrode head for mounting an electrode shall correspond to a tool head.

The base may be or may not be shared by components such as a work table of the machine tool.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a perspective view of a position adjusting device;

FIG. 3 is a plan view of the position adjusting device;

FIG. 9A illustrates a case where no bias voltage is added, and FIG. 9B illustrates a case where a bias voltage is added;

FIGS. 12A, 12B and 12C are schematic plan views of a position adjusting apparatus showing modified examples of the forms of arrangement of first and second driving and fixing members, respectively;

FIG. 18 is a side view of a principal part of a position adjusting device;

FIG. 20 is a flow chart showing the procedure for position adjustment in still another embodiment of the present invention;

DETAILED DESCRIPTION OF THE PREFERRED EMBODIMENTS

Preferred embodiments of the present invention will be described with reference to accompanying drawings.

Figure 1:
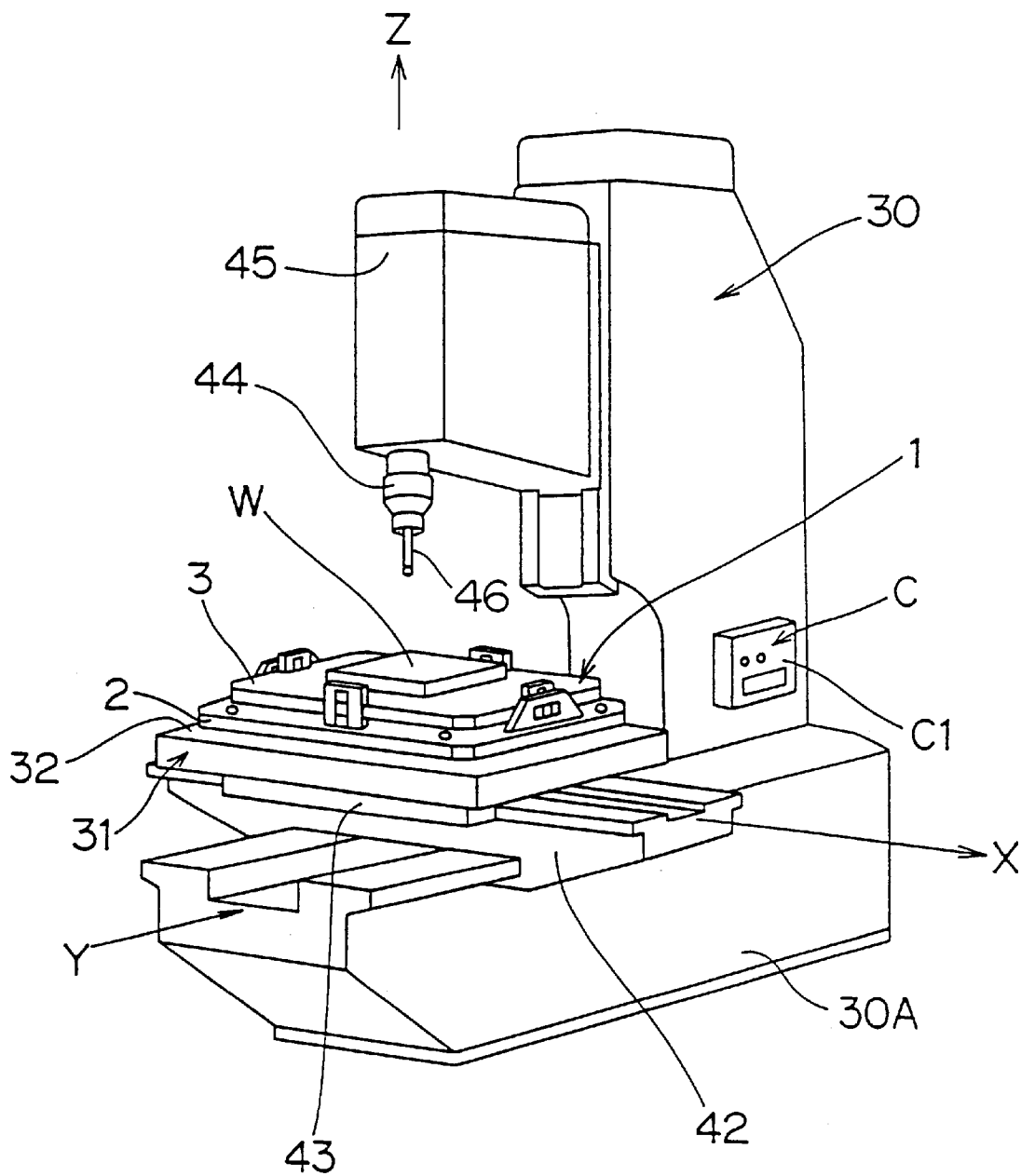
FIG. 1 is a schematic perspective view of a machine tool including a work position adjusting apparatus (hereinafter merely referred to as a position adjusting apparatus) according to one embodiment of the present invention.

FIG. 1 is a perspective view of a machine tool equipped with a work position adjusting apparatus according to one embodiment of the present invention. A work position adjusting apparatus 100 according to the present invention (hereinafter merely referred to as a position adjusting apparatus 100) comprises as a principal part a position adjusting device 1 serving as an adjusting unit fixed to an upper surface 32 serving as a reference surface of a work table 31 of a machine tool 30 using a fixed member such as a bolt. The position adjusting apparatus 100 further comprises a probe-type touch sensor 46 serving as signal outputting means mounted on a tool head 44, displacement sensors 47, 48 and 49 (see FIG. 8) for detecting respective displacements on three reference axes previously provided in the machine tool 30, and a controller C serving as controlling means for controlling operations of driving and fixing members as described later provided in the position adjusting device 1.

Figures 4A, 4B:
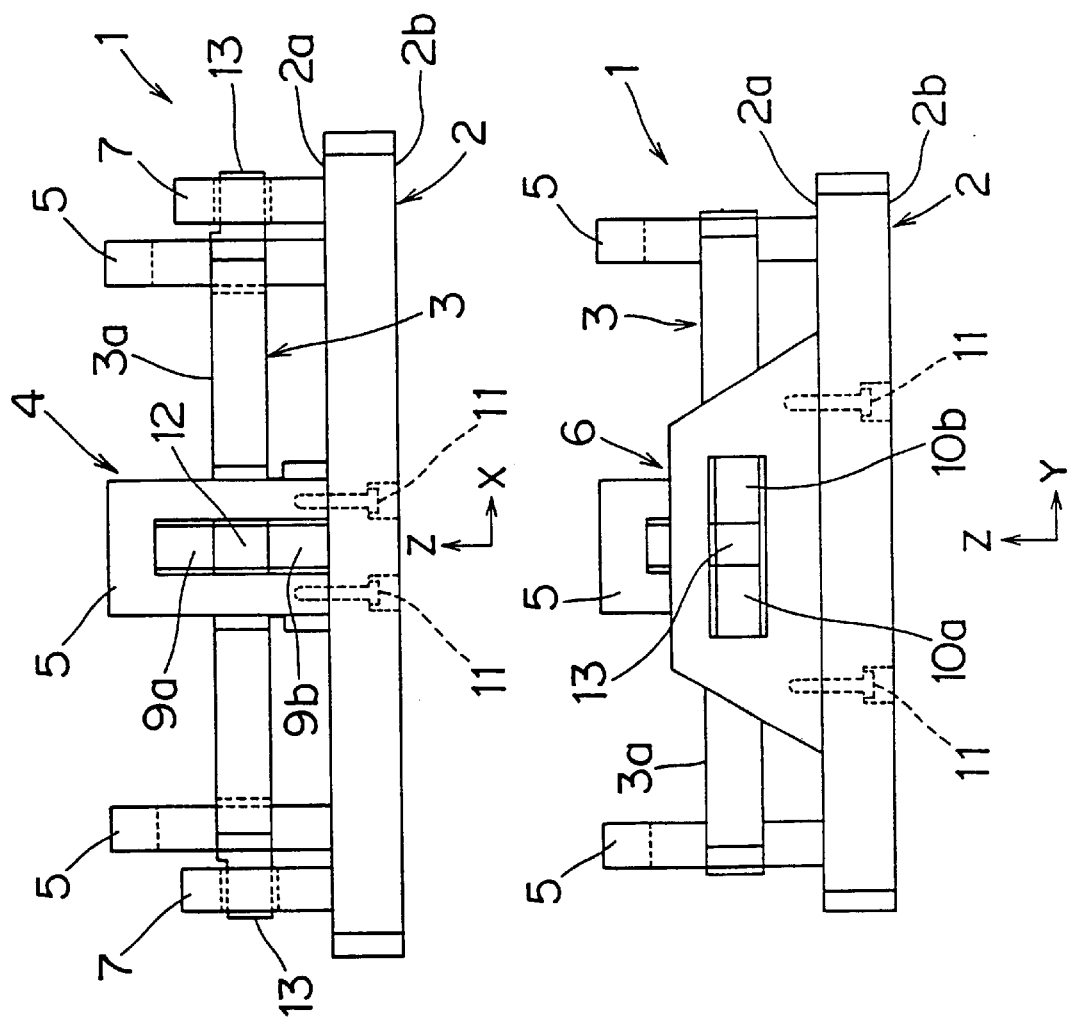
FIG. 4A is a side view showing the position adjusting device shown in FIG. 3 as viewed along the Y-axis.
FIG. 4B is a side view showing the position adjusting device shown in FIG. 3 as viewed along the X-axis.

FIG. 2 is a perspective view of the position adjusting device 1, FIG. 3 is a plan view of the position adjusting device 1, FIG. 4A is a side view showing the position adjusting device 1 as viewed along the Y-axis, and FIG. 4B is a side view showing the position adjusting device 1 as viewed along the X-axis. Referring to the drawings, the position adjusting device 1 comprises a base 2 in a rectangular plate shape fixed to the work table 31, and a mounting member 3 in a rectangular plate shape having a mounting surface 3a approximately parallel to an upper surface 2a of the base 2. The X-axis, the Y-axis and the Z-axis in the drawings are reference axes of the machine tool 30, which are the same in the following description. An X-Y plane is a plane including the X-axis and the Y-axis, and a Z-X plane is a plane including the Z-axis and the X-axis.

In FIG. 1, reference numeral 42 denotes a Y-axis moving table so supported that it can freely travel along the Y-axis by a main body 30A of the machine tool 30, and reference numeral 43 denotes an X-axis moving table so supported that it can freely travel along the X-axis by the Y-axis moving table 42. The X-axis moving table 43 and the Y-axis moving table 42 are respectively driven by an X-axis servo motor and a Y-axis servo motor (which are not illustrated in FIG. 1 but are respectively illustrated as B1 and B2 in FIG. 8). The displacements of the X-axis moving table 43 and the Y-axis moving table 42 are respectively detected by the corresponding displacement sensors 47 and 48 (see FIG. 8). The position of each of the moving tables 42 and 43 is controlled on the basis of the detected displacement.

Figure 8:
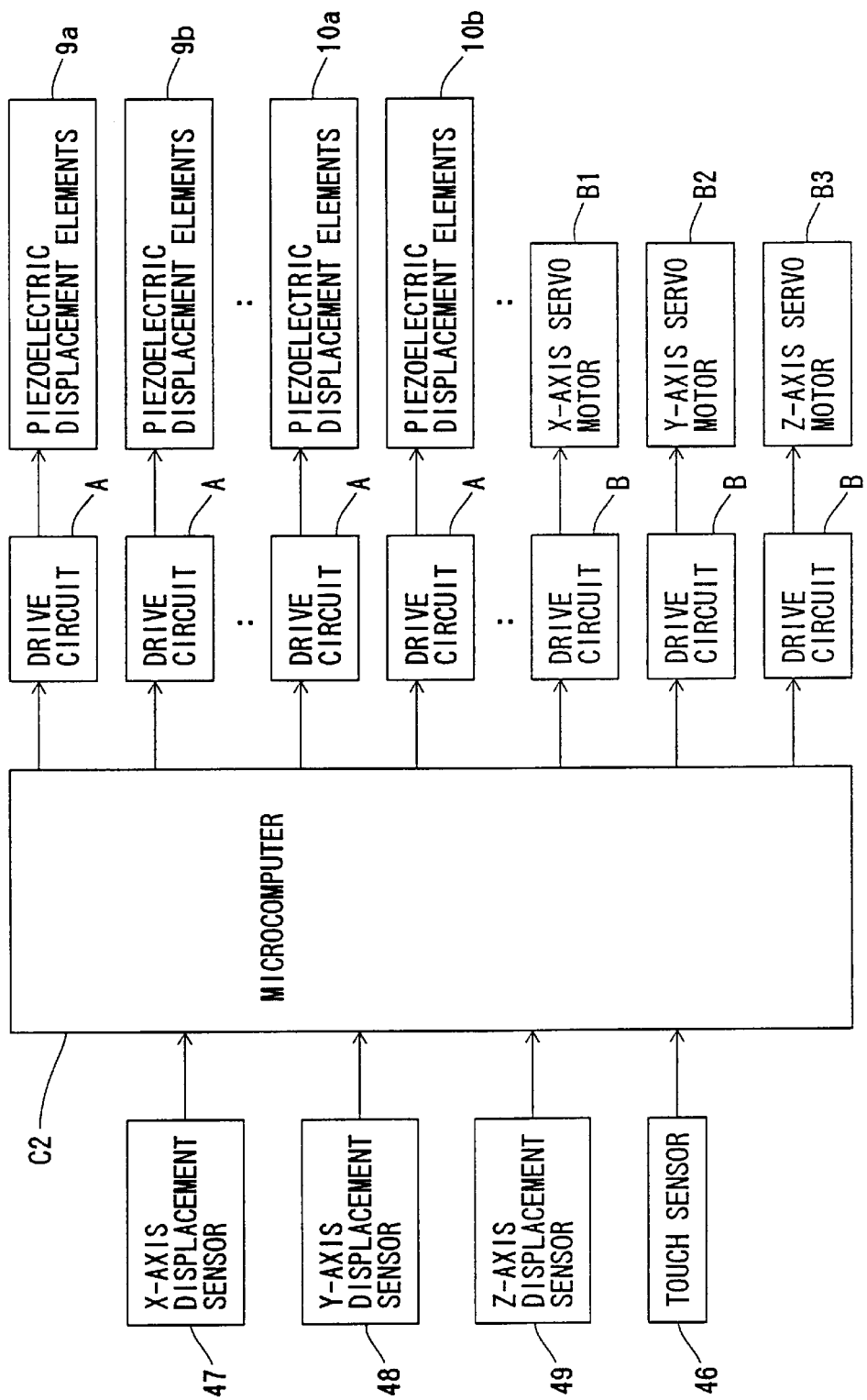
FIG. 8 is a block diagram showing the principal electrical construction of the position adjusting apparatus.

On the other hand, the tool head 44 for mounting a tool and a supporting member 45 for supporting the tool head 44 are so supported that they can freely travel along the Z-axis by the main body 30A, and the supporting member 45 is driven by a Z-axis servo motor (which is not illustrated in FIG. 1 but is illustrated as B3 in FIG. 8). Further, the direction in the Z-axis direction of the supporting member 45 is detected by the displacement sensor 49 (see FIG. 8), and the position of the supporting member 45 is controlled on the basis of the detected displacement.

As shown in FIG. 1, the controller C for adjusting the position of the mounting member 3 is mounted at a predetermined position of the machine tool 30. An operation panel C1 is arranged on the surface of the controller C, and a microcomputer C2 as described later for carrying out control of the position and the moving speed of each of the moving tables 42 and 43 and the supporting member 45, control of the number of revolutions of the tool, adjustment of the position of the work before working, and the like is mounted inside the controller C. A lead wire from each of piezoelectric displacement elements as described later is connected to the controller C, which is not illustrated.

A rolling bearing 8 for rotatably supporting the mounting member 3 around an axis 20 along the Z-axis is arranged between the center of the mounting member 3 and the base 2. The upper surface 2a and a lower surface of the base 2 are reference surfaces of the base 2, and the lower surface serving as the reference surface is fixed along the upper surface of the work table 31. Therefore, the upper surface 2a serving as the reference surface of the base 2 is almost properly positioned.

Figure 5:
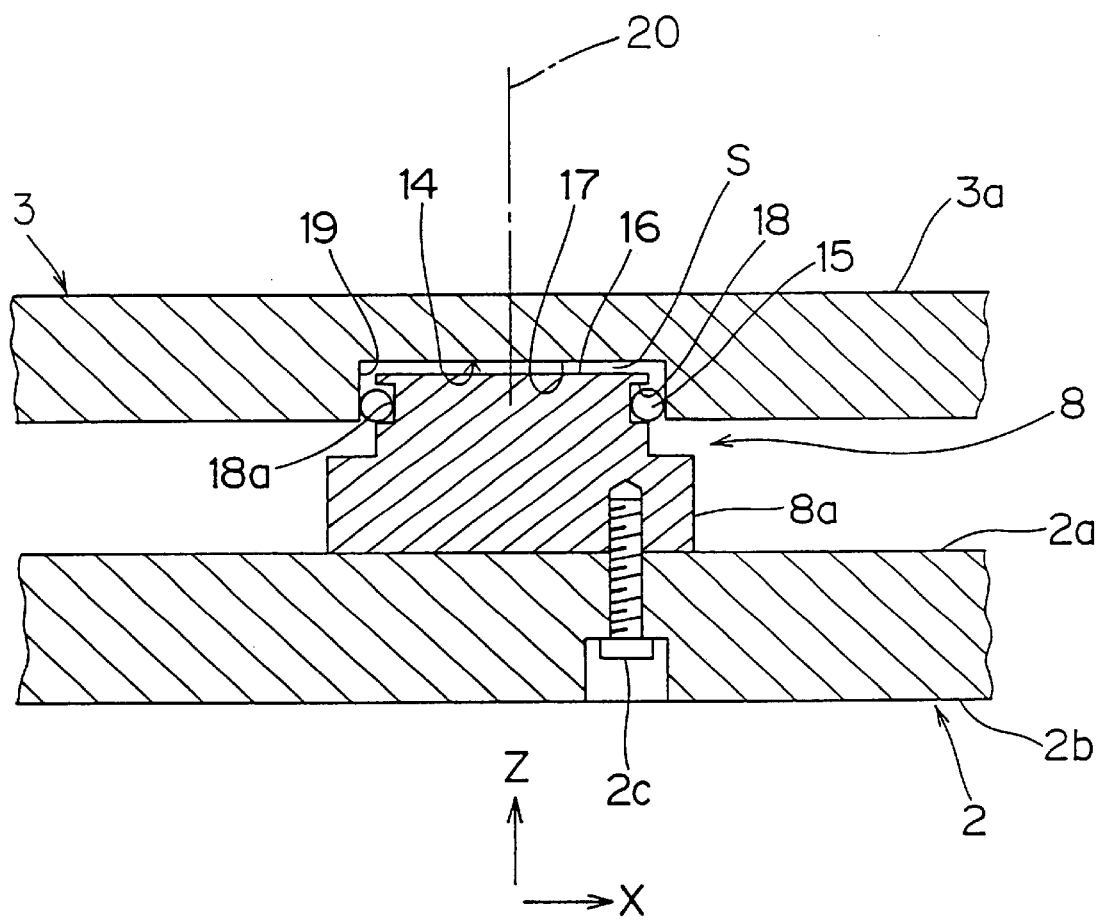
FIG. 5 is a cross-sectional view along a V—V line shown in FIG. 3.

Referring to FIG. 5 which is a cross-sectional view along the X-axis in FIG. 3, the rolling bearing 8 is composed of a radial ball bearing, for example, and has a supporting main unit 8a in an approximately cylindrical shape fixed to the upper surface 2a of the base 2 by a screw 2c. A groove 18 having an inner raceway surface 18a is formed on a peripheral surface of the supporting main unit 8a, and a plurality of balls 15 made of steel, for example, held in the groove 18 are fitted in a receiving portion 14 composed of a circular hole formed on the lower surface of the mounting member 3. The balls 15 are revolved while being rolled using an inner peripheral wall of the receiving portion 14 as an outer raceway surface 19. Further, the balls 15 are so set as to be rolled in a state where a clearance is zero with the inner raceway surface 18a and the outer raceway surface 19.

On the other hand, a predetermined clearance S is provided between an upper surface 16 of the supporting main unit 8a and a bottom surface 17 of the receiving portion 14, and the rolling bearing 8 does not support the mounting member 3 in the Z-axis direction but supports only the rotation of the mounting member 3 along the X-Y plane. Consequently, the movement of the mounting member 3 in the direction along the X-axis and in the direction along the Y-axis is regulated by the rolling bearing 8. Further, the mounting member 3 can be also displaced in an inclined shape in the Z-axis direction, with the center of revolution of the ball 15 used as a support, by the above-mentioned clearance S.

In the present embodiment, description is made of a case where a work W is directly mounted on the mounting surface 3a of the mounting member 3. A reference guide rail 3c in an angle shape, for example (see FIG. 2. The illustration of the reference guide rail 3c is omitted in the other drawings) is arranged in a required position of the mounting surface 3a of the mounting member 3. The work W is put on the mounting surface 3a in a state where it is along the reference guide rail 3c, so that the work W is roughly positioned. As means for fixing the work W to the mounting surface 3a, means for inserting a screw for work fixing into a tapped hole formed on the mounting surface 3a and pressing and fixing the work W to the mounting surface 3a can be illustrated. Further, in a case where a load is hardly applied to the work W by an electric discharge machining, for example, it is also possible to bond and fix the work W to the mounting surface 3a using an adhesive such as an instantaneous adhesive.

Figure 21:
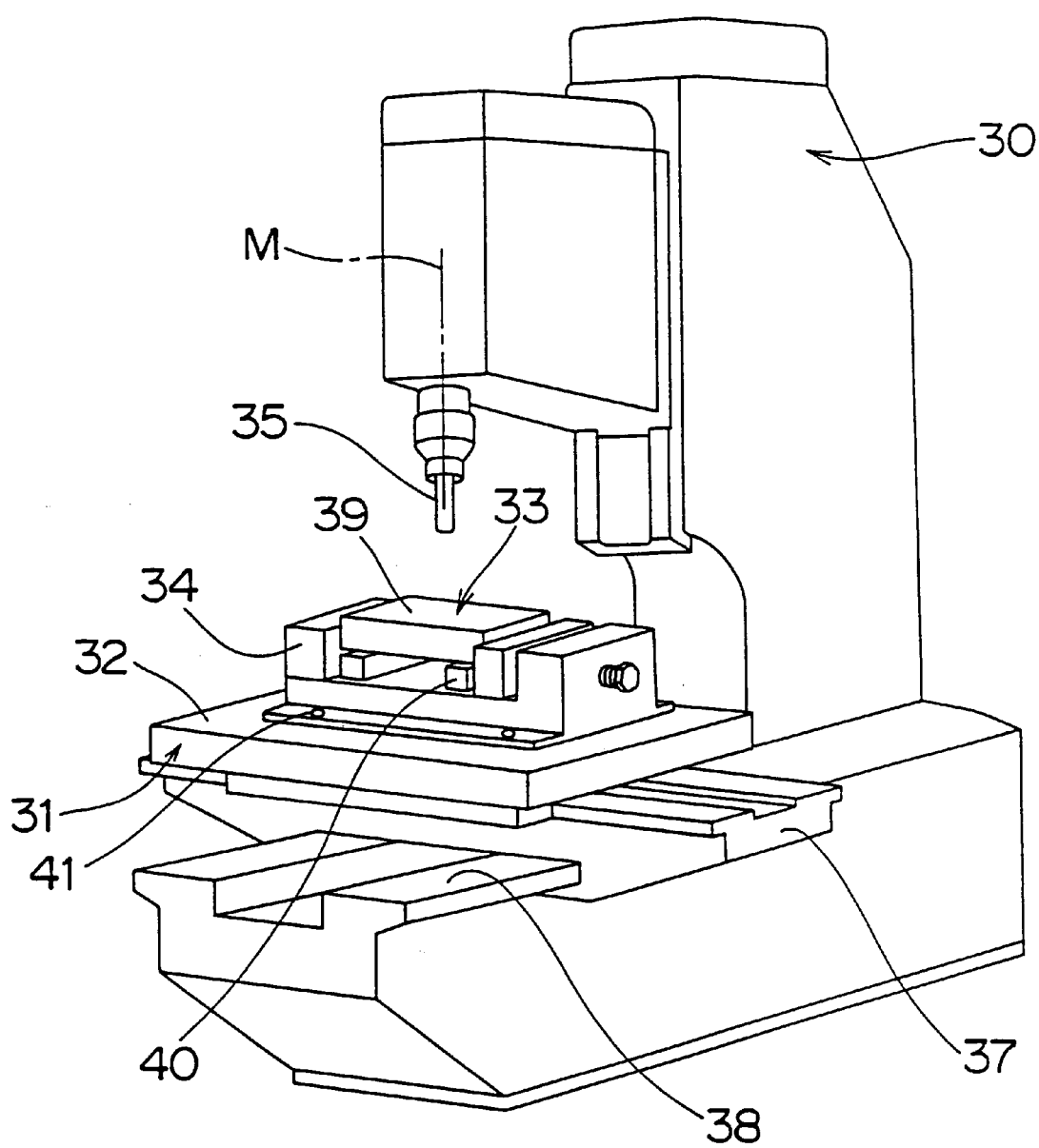
FIG. 21 is a schematic perspective view of a conventional machine tool.
Figure 22:
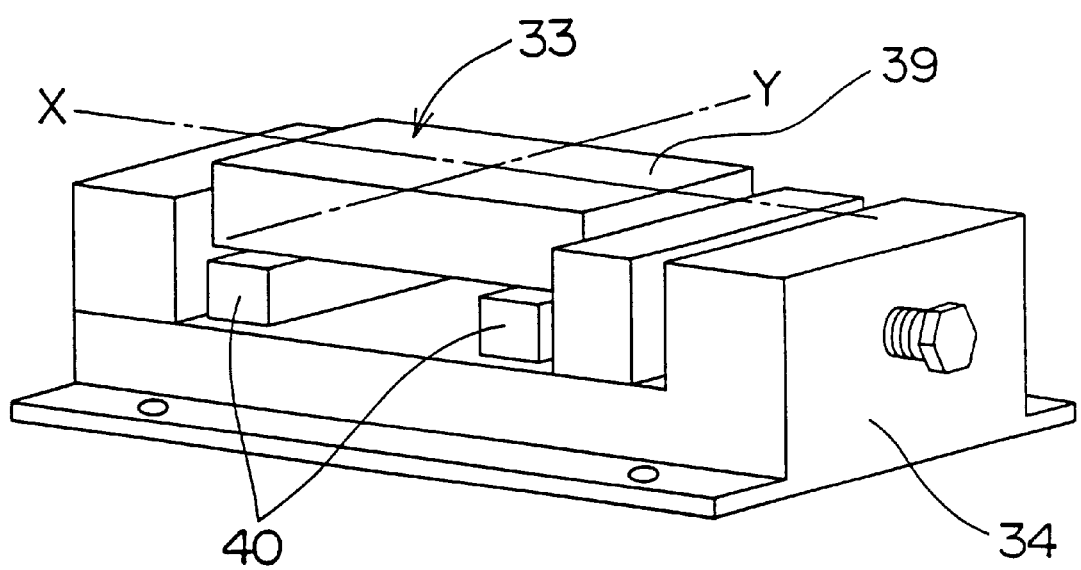
FIG. 22 is a schematic perspective view of a conventional work supporting device.

There is a system for indirectly fixing the work W through a mounting vice (for example, one which is the same as that shown in the conventional example in FIG. 21) fixed to the mounting surface 3a, in addition to a system of directly fixing the work W to the mounting surface 3a. Further, the work W may be fixed to the mounting member 3 through an attachment such as an automatic centering device suitable for unmanned automatic working.

Referring to FIG. 3, recesses 3b are formed in respective central portions of the four sides of the mounting member 3, and driving projections 12 and 13, which are rectangular in cross section, are so formed as to project outward from respective central portions of the recesses 3b. The driving projections 12 respectively extend in the Y-axis direction and a reversed Y-axis direction, and the driving projections 13 respectively extend in the X-axis direction and a reversed X-axis direction and are so set as to be longer than the driving projections 12. The driving projections 12 and 13 are respectively supported in the Z-axis direction by first driving and fixing members 4 serving as first correcting means. Further, the longer driving projections 13 are respectively supported in the direction of rotation around the axis 20 parallel to the Z-axis by second driving and fixing members 6 serving as second correcting means.

The first driving and fixing members 4 are so arranged as to divide the circumference centered around the axis 20 into equal divisions. The paired second driving and fixing members 6 are arranged in positions which are symmetrical with respect to the axis 20 interposed therebetween. The first driving and fixing members 4 respectively adjust the heights in the central portions of the four sides of the mounting member 3 through the driving projections 12 or 13, to adjust the inclinations of the mounting surface 3 relative to the X-axis and the Y-axis, and adjust the inclination of a work surface Wa of the work W through the adjustment. On the other hand, the second driving and fixing members 6 respectively adjust the position where the mounting member 3 is rotated, and therefore the work W is rotated around the axis 20 through the driving projections 13.

Each of the first driving and fixing members 4 includes piezoelectric displacement elements 9a and 9b which are paired with each other. The piezoelectric displacement elements 9a and 9b are supported on the upper surface 2a of the base 2 by a fixed frame 5 having a channel shape, fixed to the upper surface 2a of the base 2 by a screw 11. The fixed frame 5 comprises a transverse bar 5a parallel to the upper surface 2a of the base 2 and a pair of legs 5b connected to both ends of the transverse bar 5a. The driving projection 12 penetrates a space defined by the fixed frame 5 and the upper surface 2a of the base 2, and the piezoelectric displacement elements 9a and 9b are respectively arranged above and below the driving projection 12 in the space.

The piezoelectric displacement element in the present embodiment is constructed by laminating a plurality of piezoelectric elements having the property of expanding and contracting if a voltage is applied thereto, where it is possible to obtain an amount of displacement corresponding to the applied voltage and obtain an arbitrary amount of displacement corresponding to the number of piezoelectric elements laminated. That is, when a large amount of displacement is required, a piezoelectric displacement element formed of a large number of laminated piezoelectric elements, may be selected and used. On the other hand, when a required amount of displacement is small, a piezoelectric displacement element having a small number of laminated piezoelectric elements, may be selected and used. The piezoelectric displacement element has sufficiently high rigidity to withstand a load of several hundred kilograms, and has a fast displacement response to the applied voltage, although the size thereof is generally very small, for example, approximately 10 mm×10 mm×18 mm. When it is necessary to receive a larger load, a piezoelectric displacement element having a large load area may be used.

Each of side surfaces 22 of each of the piezoelectric displacement elements 9a and 9b is fixed to the leg 5b through a layer 21 of an adhesive having elasticity, such as an adhesive including silicone interposed between the side surface 22 and an opposite inner surface of the leg 5b. Each of an upper surface 23a and a lower surface 23b of each of the piezoelectric displacement elements 9a and 9b is not fixed to a surface opposite thereto. Even if the mounting member 3 is rotated by the second driving and fixing member 6, so that the driving projection 12 is subjected to a displacement in the horizontal direction, no excessive stress is applied to the piezoelectric displacement elements 9a and 9b. In the drawings, reference numerals 24 and 25 denote lead wires for applying a driving voltage to the piezoelectric displacement elements 9a and 9b.

As described in the foregoing, each of the piezoelectric displacement elements 9a and 9b expands and contracts by application of a voltage. The lower piezoelectric displacement element 9b is caused to contract while the upper piezoelectric displacement element 9a is expanded, so that the driving projection 12 is pressed and displaced downward in a state where it is interposed from above and below. On the contrary, the upper piezoelectric displacement element 9a is caused to contract while the lower piezoelectric displacement element 9b is expanded, so that the driving projection 12 is pressed and displaced upward in a state where it is interposed from above and below.

The inclination of the mounting member 3 relative to the X-axis can be adjusted by the pair of first driving and fixing members 4 arranged along the X-axis, while the inclination of the mounting member 3 relative to the Y-axis can be adjusted by the pair of first driving and fixing members 4 arranged along the Y-axis. The inclination of the mounting surface 3a of the mounting member 3 is adjusted in two crossing directions, thereby making it possible to adjust the inclination of the work surface Wa corresponding to a first surface of the work W mounted on the mounting surface 3a. That is, the work surface Wa of the work W can be so adjusted as to be parallel to the X-Y plane.

Figure 7:
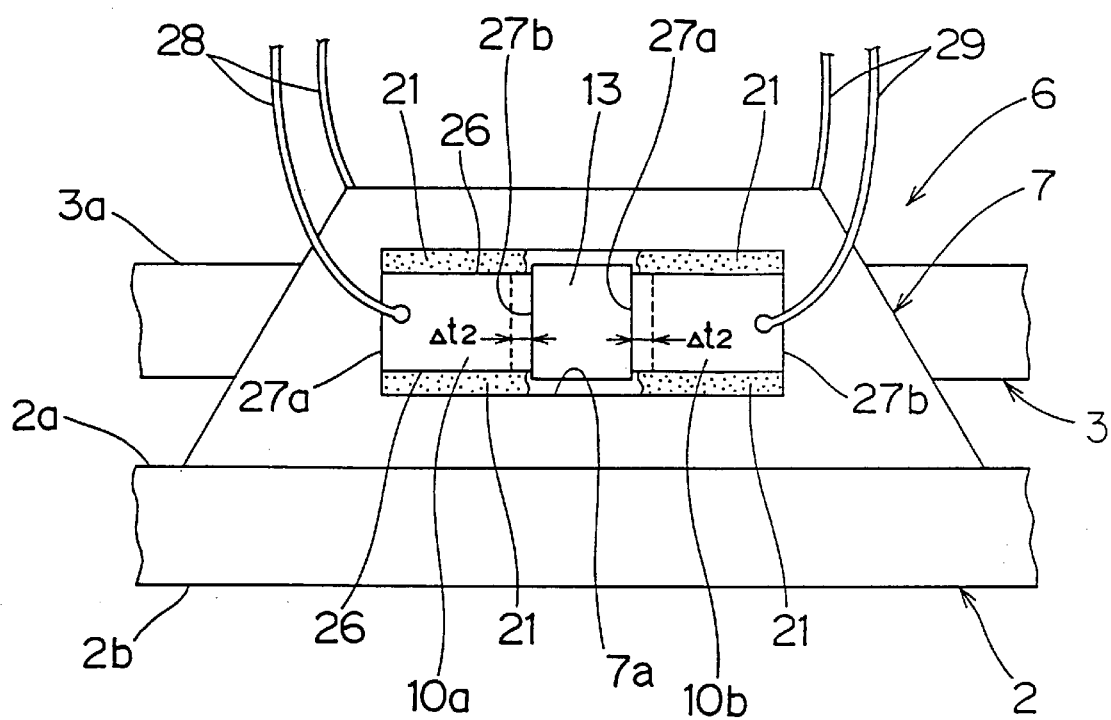
FIG. 7 is a side view of a second driving and fixing member and its peripheral portion, which illustrates a state where a mounting member is held in its initial position by a pair of piezoelectric displacement elements.

On the other hand, referring to FIG. 3, the longer driving projections 13 extending in the X-axis direction and the reversed X-axis direction are also received by the second driving and fixing members 6, respectively. The second driving and fixing member 6 is arranged at an end of the driving projection 13. Referring to FIG. 7 which is a side view of the second driving and fixing member 6 as viewed along the X-axis, each of the second driving and fixing members 6 comprises a pair of piezoelectric displacement elements 10a and 10b, and the piezoelectric displacement elements 10a and 10b are supported by a fixed frame 7 in a trapezoidal shape. FIG. 7 illustrates a state where the driving projection 13 is in its initial position, which is the center in the lateral direction of a through hole 7a, as described later with respect to the fixed frame 7. In FIG. 7, a position indicated by a broken line is the position of an end surface of each of the piezoelectric displacement elements 10a and 10b in a state where no voltage is applied thereto.

The fixed frame 7 is fixed to the upper surface 2a of the base 2 by the screw 11, and has a rectangular through hole 7a. The driving projection 13 penetrates the center of the through hole 7a. The piezoelectric displacement elements 10a and 10b are respectively arranged on the right and the left of the driving projection 13 in the through hole 7a. The paired piezoelectric displacement elements 10a and 10b press the driving projection 13 in opposite directions, and rotate the mounting member 3 in cooperation with each other. Each of upper and lower surfaces 26 of each of the piezoelectric displacement elements 10a and 10b is fixed to the fixed frame 7 through a layer 21 of an adhesive having elasticity such as an adhesive including silicone between the surface 26 and an opposite inner upper or inner bottom surface of the through hole 7a. On the other hand, left and right side surfaces 27a and 27b of each of the piezoelectric displacement elements 10a and 10b are not fixed to left or right side surfaces of the driving projection 13 and the through hole 7a.

Even if the driving projection 13 is displaced in the Z-axis direction by the first driving and fixing member 4, therefore, the fixed frame 7 and the piezoelectric displacement elements 10a and 10b fixed thereto do not restrict the displacement, and the piezoelectric displacement elements 10a and 10b receive no excessive force.

FIG. 8 is a block diagram showing the electrical construction of the position adjusting apparatus 100 according to the present embodiment. Referring to FIG. 8, in the present embodiment, a signal from an X-axis displacement sensor 47 for detecting the displacement of the X-axis moving table 43, a signal from the Y-axis displacement sensor 48 for detecting the displacement of the Y-axis moving table 42, a signal from the Z-axis displacement sensor 49 for detecting the displacement in the Z-axis direction of the supporting member 45, and a signal from a touch sensor 46 (to be a trigger signal) are inputted to the microcomputer C2.

The touch sensor 46 is mounted on the tool head 44 in place of a tool, and emits a signal upon detecting the contact with the work W. An end of a contact of the touch sensor 46 is formed in a spherical shape, and allows the contact in all directions.

On the other hand, the microcomputer C2 controls voltages applied to piezoelectric displacement elements 9a, 9b, 10a and 10b through driving circuits A each of which includes a D/A converter. Further, the microcomputer C2 controls the driving of X-axis, Y-axis and Z-axis servo motors B1, B2 and B3 through driving circuits B, respectively.

The voltage to be applied to each of the piezoelectric displacement elements 9a, 9b, 10a and 10b will hereafter be described.

Figure 6A:
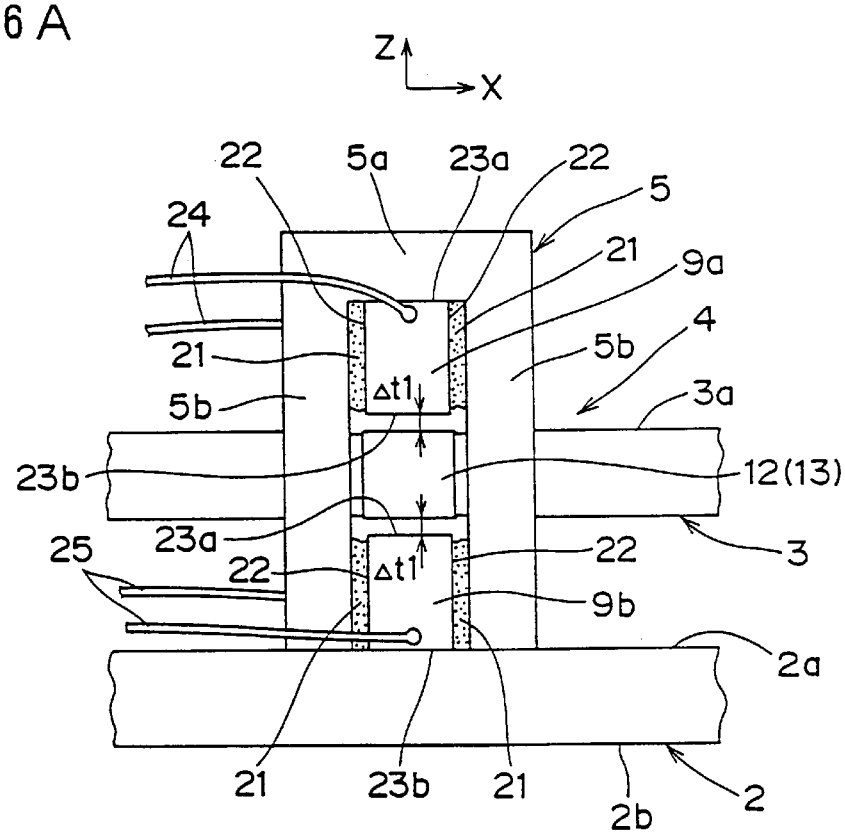
FIG. 6A is a side view of a first driving and fixing member and its peripheral portion, which illustrates a state where a pair of piezoelectric displacement elements are not energized.
Figure 6B:
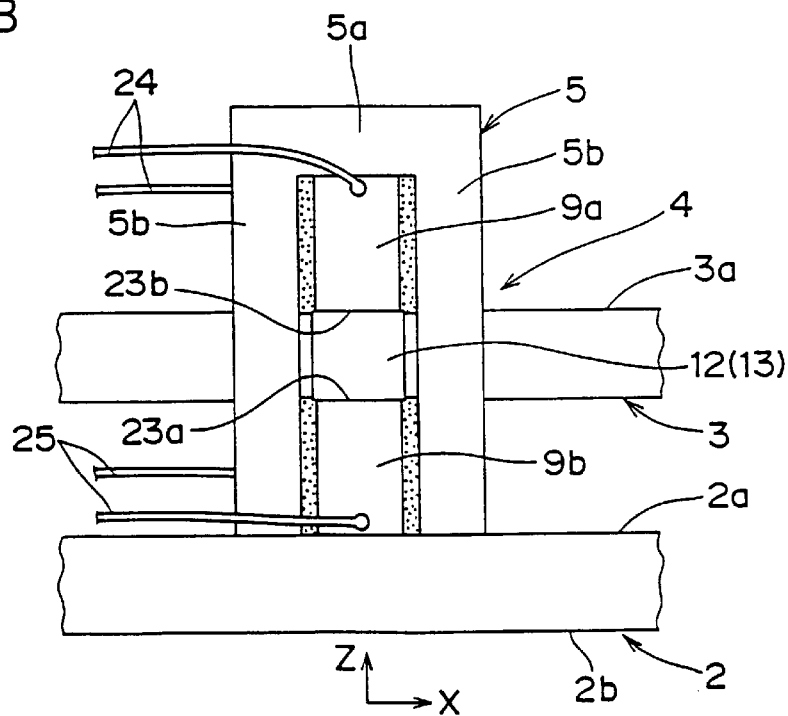
FIG. 6B is a side view of a first driving and fixing member and its peripheral portion, which illustrates a state where a mounting member is held in its initial position by both the piezoelectric displacement elements.

FIG. 6A illustrates a state where the voltages respectively applied to the piezoelectric displacement elements are zero volt wherein a total clearance between the piezoelectric displacement elements and the driving projection 12 is $\Delta t1 \times 2$. That is, the driving projection 12 of the mounting member 3 can be displaced by a maximum of $\Delta t1 \times 2$ in the vertical direction. Each of the piezoelectric displacement elements 9a and 9b must be one in which the displacement of at least Δt1×2 is obtained. When an applied voltage in a case where the displacement of Δt1×2 is obtained is taken as V1 volts, both the piezoelectric displacement elements 9a and 9b in the first driving and fixing member 4 extend by Δt1 vertically and in opposite directions upon application of a voltage of V1/2 in a normal state where the inclination of the work surface Wa is not corrected, thereby interposing the driving projection 12 of the mounting member 3 from above and below and just fix the driving projection 12 in a central position in the range of displacement (the above-mentioned initial position).

Similarly, when a total clearance between both the piezoelectric displacement elements 10a and 10b of the second driving and fixing member 10 and the driving projection 13, in a case where both voltages V10a and V10b applied to the piezoelectric displacement elements 10a and 10b are zero volt is taken as Δt2×2, the piezoelectric displacement elements 10a and 10b extend by Δt2 horizontally and in opposite directions upon application of a voltage of V2/2 volts in a normal state where the degree of parallelization is not corrected when an applied voltage required to obtain a displacement of Δ2/2×2 is taken as V2 volts, thereby interposing the driving projection 13 from the right and the left and just fix the driving projection 13 in a central position in the range of displacement (the above-mentioned initial position).

Figure 9A:
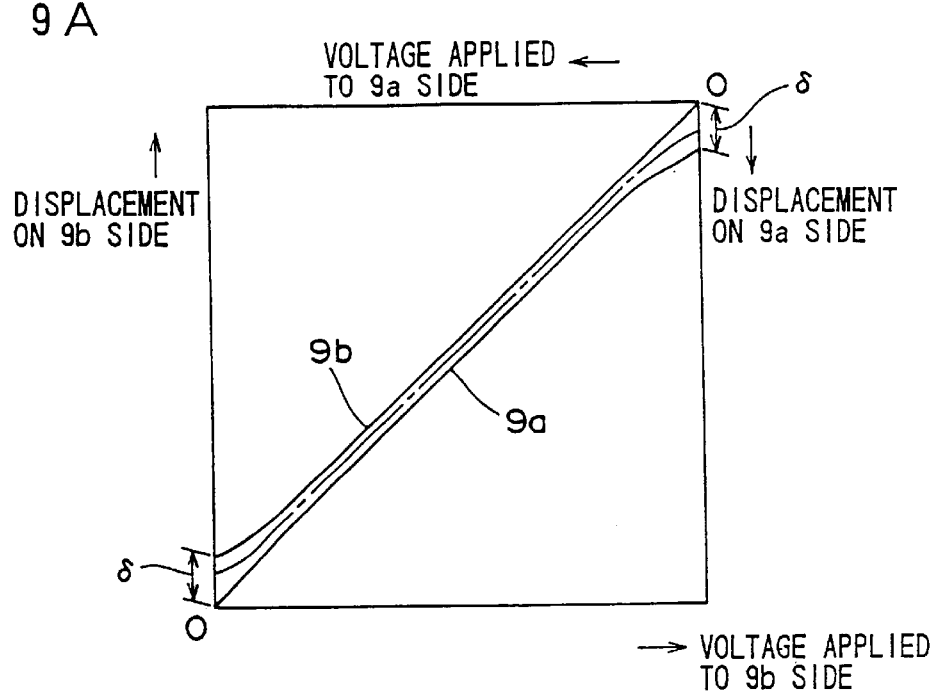
FIGS. 9A and 9B are graphs respectively showing the relationship between a voltage and a displacement of a pair of piezoelectric displacement elements, where

If a voltage is applied once to the piezoelectric displacement elements 9a and 9b, a residual displacement δ actually occurs even after the voltage is removed. Therefore, the displacement of the driving projection 12 or 13 interposed between the piezoelectric displacement elements 9a and 9b may deviate from its proper position, as shown in FIG. 9A. In FIG. 9A, the displacement of the driving projection 12 or 13 may be one in an intermediate position between the voltage-displacement characteristics of the lower piezoelectric displacement element 9b and the voltage-displacement characteristics of the upper piezoelectric displacement element 9a (indicated by a one-dot and dash line).

Figure 9B:
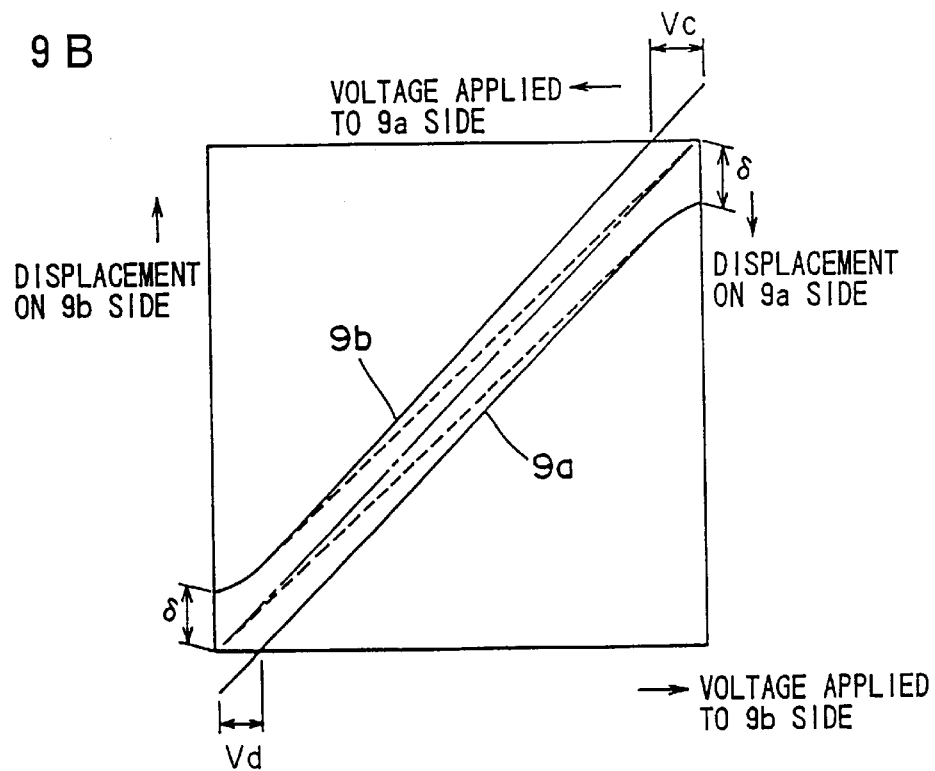

In order to correct a deviation in displacement caused by the residual displacement δ and improve the linearity of the voltage-displacement characteristics, overdrive voltages having bias voltages Vc and Vd added thereto are respectively applied to the piezoelectric displacement elements 9a and 9b, so that the displacement of the driving projection 12 or 13 almost passes through the origin (see FIG. 9B).

The bias voltage for overdriving is not a predetermined voltage, and is so applied that it is increased in proportion to an amount of displacement of the piezoelectric displacement element. That is, in the embodiment shown in FIG. 9B, the bias voltage is zero when the amount of displacement of the piezoelectric displacement element is zero (only the residual displacement δ), is increased as the amount of displacement is increased, and becomes Vc at the time of the maximum displacement.

Figure 10:
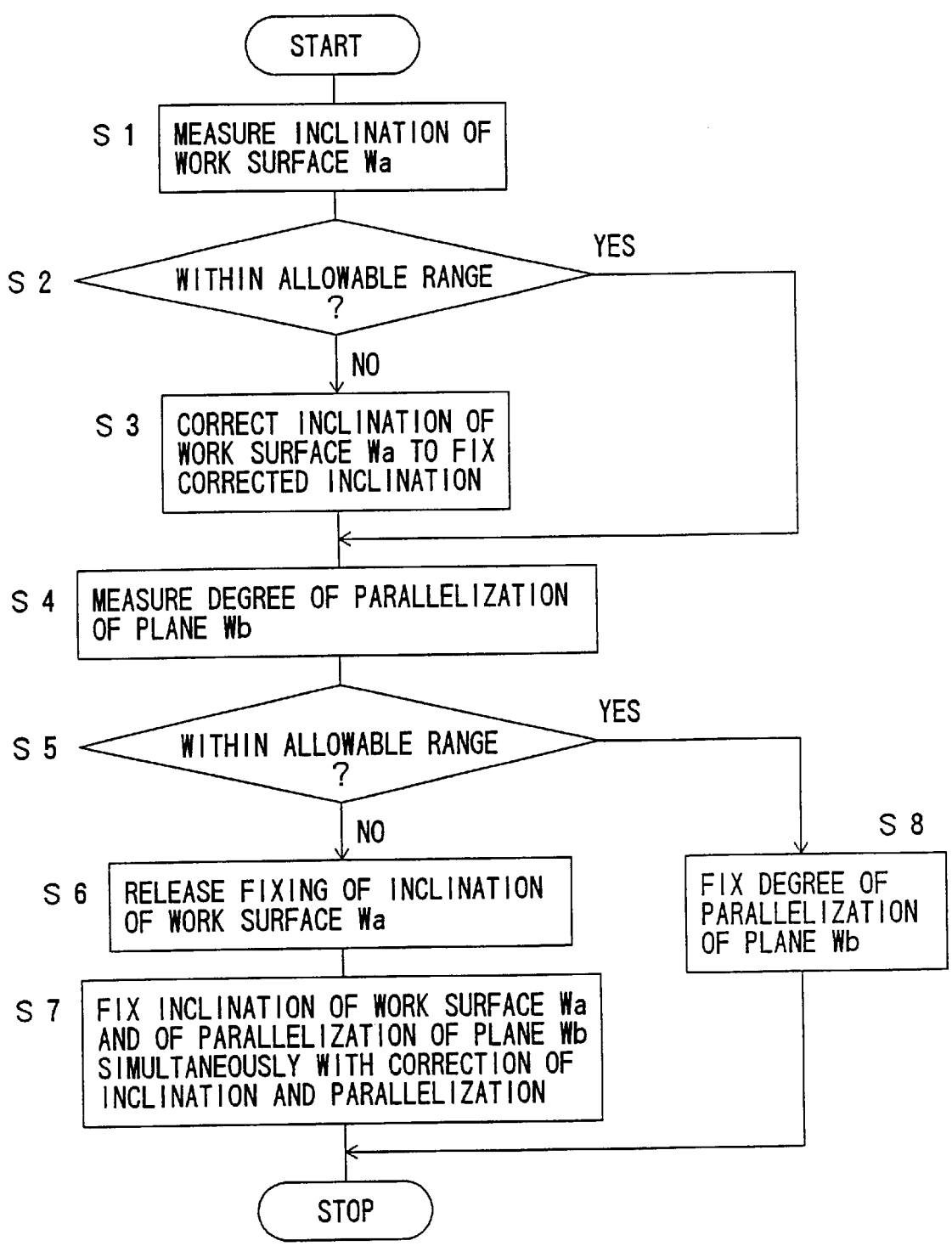
FIG. 10 is a flow chart showing the procedure for position adjustment.

Operations in a case where the position of the work W is controlled using the above-mentioned position adjusting apparatus 100 will be described on the basis of a flow chart shown in FIG. 10.

The inclination of the work surface Wa serving as a reference surface is first corrected with respect to the work W coarsely positioned using the above-mentioned reference guide rail (steps S1 to S3). The work surface Wa must be along an X-Y plane whose inclination is zero by correcting an error in inclination of the work surface Wa relative to the X-Y plane.

A plane in an three-dimensional XYZ coordinate space can be expressed by the following equation:

$$aX+bY+c=Z \tag{1}$$

In this equation, a represents the inclination in the X-axis direction, and b represents the inclination in the Y-axis direction. The inclination in the X-axis direction means the inclination of the line at which the Z-X plane intersects the plane, for example the work surface Wa, with respect to the X-axis. The inclination in the Y-axis direction means the inclination of the line at which the Z-Y plane intersects the plane, for example the work surface Wa, with respect to the Y-axis. The coordinates of three arbitrary points are taken as (X1, Y1, Z1), (X2, Y2, Z2), and (X3, Y3, Z3). When the inclinations a and b of a cubic equation obtained by substituting the coordinates into the foregoing equation (1) are found, a and b are expressed by the following equations (2) and (3):

$$a = \frac{(Z1-Z2)-(Z1-Z3)\times[(Y1-Y2)/(Y1-Y3)]}{(X1-X2)-(X1-X3)\times[(Y1-Y2)/(Y1-Y3)]} \tag{2}$$

$$b = \frac{(Z1-Z2)-a(X1-X2)}{Y1-Y2} \tag{3}$$

The coordinates (x1, y1, z1), (x2, y2, z2) and (x3, y3, and z3) of three arbitrary points $P_1$, $P_2$ and $P_3$ on the work surface Wa of the work W are first measured. In the microcomputer C2, the actual degree of inclination in each of the X-axis direction and the Y-axis direction of the work surface Wa serving as a reference surface is found on the basis of the coordinates and the foregoing equations (2) and (3) (step S1).

Specifically, in the microcomputer C2, the X-axis moving table 43 and the Y-axis moving table 42 are driven to coincide with the X and Y coordinates of the point $P_1$, for example, after which the supporting member 45 is slowly lowered to stop being lowered at the time point where the touch sensor 46 is brought into contact with the work surface Wa thereby a trigger signal is inputted thereto, and the Z coordinates of the point $P_1$ at this time point are detected so as to obtain the three-dimensional coordinates of the point $P_1$. The same is true for the points $P_2$ and $P_3$.

When the found degree of inclination is not within an allowable range (for example, not more than 0.5 μm with respect to a span of 100 mm), the inclination is corrected, and the corrected inclination is fixed (steps S2 and S3).

When the pitch between the two first driving and fixing members 4 in the X-axis direction is taken as d1 mm (see FIG. 3), relative amounts of correction of the inclination in the Z-axis direction of the mounting member 3 in the two first driving and fixing members 4 are a total of a×d1×1000 μm. That is, a displacement of a×d1×1000/2 μm may be corrected with respect to the center of the mounting member 3 by one of the first driving and fixing members 4. On the other hand, a displacement of a×d1×1000/2 μm may be corrected in the opposite direction with respect to the other first driving and fixing member 4.

An applied voltage required for a displacement per 1 μm of the piezoelectric displacement element is previously found. When the applied voltage is taken as K1 volts, therefore, the following correction voltages are respectively applied to the piezoelectric displacement elements 9a and 9b in one of the pair of first driving and fixing members 4 arranged along the X-axis:

$$V_{9a}=V1/2+(K1\times a\times d1\times1000/2) \tag{4}$$

$$V_{9b}=V1/2-(K1 \times a \times d1 \times 1000/2) \quad (5)$$

The following correction voltages are respectively applied to the piezoelectric displacement elements 9a and 9b in the other first driving and fixing member 4:

$$V_{9a}=V1/2-(K1 \times a \times d1 \times 1000/2) \quad (6)$$

$$V_{9b}=V1/2+(K1 \times a \times d1 \times 1000/2) \quad (7)$$

The foregoing value a may positive or negative.

The inclination of the work surface Wa in the X-axis direction which is thus found by measuring the degree of inclination once, can be corrected at a time. The inclination in the Y-axis direction can be also corrected simultaneously with the correction of the inclination in the X-axis direction in the same manner as that in the X-axis direction.

The coordinates of two points $P_4$ and $P_5$ on a plane Wb are measured in a state where the correction is so made that the work surface Wa is along the X-Y plane, that is, in a state where the axis 20 perpendicular to the work surface Wa is along the Z-axis. Although the manner of the measurement is basically the same as that in a case where the coordinates of the three points $P_1$, $P_2$ and $P_3$ on the work surface Wa are measured, it differs in that the X-axis moving table 43 and the supporting member 45 are driven to set the X and Z coordinates of the point $P_4$, for example, after which the Y-axis moving table 42 is driven to abut the touch sensor 46 against the plane Wb.

The inclination of the plane Wb relative to the X-axis (the degree of parallelization between the plane Wb and the X-axis) is measured on the basis of the coordinates of the two points $P_4$ and $P_5$ which are thus measured and the following equation (4) (step S4). When the measured inclination is not within an allowable range (within 0.5 μm with respect to a span of 100 mm, for example), the fixing of the inclination of the work surface Wa is released once, after which the correction of the inclination of the work surface Wa (the same correction as that in the step S3) and the correction of the inclination (that is, the correction of the degree of parallelization) of the plane Wb are simultaneously made, and fix the corrected inclination of the work surface Wa (steps S5, S6, and S7).

Consider a case where the inclination of the plane Wb had already been within the allowable range when it was corrected. In this case, the degree of parallelization is fixed by the second driving and fixing members 6 as it is (that is, in a state where the inclination of the work surface Wa is fixed by the first driving and fixing members 4) (steps S5 and S8).

Specifically, an error in the direction of rotation of the work surface Wa within the X-Y plane is adjusted by using the plane Wb corresponding to a second surface perpendicular to the work surface Wa as a reference surface and adjusting the degree of parallelization in the X-axis direction between the plane Wb serving as the reference surface and the Z-X plane. The degree of parallelization in the X-axis direction between the Wb and Z-X planes means the degree of parallelization between X-axis and the line at which the X-Y plane intersects the plane Wb. When the X and Y coordinates of the two arbitrary points $P_4$ and $P_5$ are measured on the plane Wb serving as the reference surface of the degree of parallelization, and the found coordinates of the two points $P_4$ and $P_5$ are respectively taken as (x4, y4) and (x5, y5), the inclination e in the direction of rotation within the X-Y plane is expressed by the following equation:

$$e=(y4-y5)/(x4-x5) \quad (8)$$

When the distance between the second driving and fixing member 6 and the axis of rotation 20 is taken as d3 mm, therefore, the second driving and fixing member 6 may displace the mounting member 3 in the direction of rotation by an amount of correction of d3×e×1000 μm. An applied voltage required for a displacement per 1 μm of each of the piezoelectric displacement elements 10a and 10b in the second driving and fixing member 6 is previously found. When the applied voltage is taken as K2 volts, therefore, the following correction voltages are respectively applied to the piezoelectric displacement elements 10a and 10b:

$$V_{10a}=V2/2+(K2 \times e \times d3 \times 1000) \quad (9)$$

$$V_{10b}=V2/2-(K2 \times e \times d3 \times 1000) \quad (10)$$

An error in the degree of parallelization, which is thus found by measuring the degree of parallelization once, can be corrected at a time. The foregoing value e may be either of positive or negative.

In the present embodiment, the correction of the inclination of the work surface Wa of the work W and the correction of the degree of parallelization of the plane Wb can be made without human intervention very simply, in a short time and with high precision. As a result, it is also possible to automate the preparation of the adjustment.

The driving and fixing members 4 and 6 serving as correcting means are also used as locking means for fixing positions, so that the construction of the position adjusting apparatus can be simplified.

Particularly, the mounting member 3 is supported so as to be rotatable around the axis 20 which is perpendicular to the mounting surface 3a, so that a deviation in rotation can be corrected only by providing the second driving and fixing member 4 in one position on the circumference. In this case, the construction of the position adjusting apparatus can be simplified, and a supporting structure including the driving and fixing member 4 can sufficiently withstand a cutting stress exerted on the X-Y plane. In the above-mentioned embodiment, a pair of second driving and fixing members 4 is arranged in positions which are symmetrical with the axis 20 interposed therebetween in order to improve rigidity corresponding to a higher driving force and a stronger cutting stress.

Since the piezoelectric displacement elements 9a, 9b, 10a and 10b are used, the following advantages are obtained. That is, the piezoelectric displacement element makes it possible to significantly miniaturize the driving and fixing members 4 and 6 serving as correcting means and to bear a sufficient fixing load. Further, the piezoelectric displacement element has an amount of displacement which is stabilized against an applied voltage as well as a good response function, so that a displacement can be quickly adjusted to be the desirable one. On the other hand, a piezoelectric displacement element having an arbitrary amount of displacement can be obtained depending on the number of laminated layers of piezoelectric elements. Therefore, a piezoelectric displacement element has flexibility in terms of a desirable amount of displacement since it can be selected and used depending on an amount of adjustment required. Further, the reproducibility of applied voltage-displacement amount characteristics are good, so that the correction can be made with high precision by performing setting only once.

The paired piezoelectric displacement elements constituting each of the driving and fixing members are sufficient if they can drive the mounting member 3 in opposite directions. The form of arrangement thereof is not particularly limited. For example, the paired piezoelectric displacement elements may be arranged a distance away from each other.

Further, the paired piezoelectric displacement elements may be one element arranged on each side with a rotating support such as a spherical bearing interposed therebetween, and rotating the mounting member 3 in opposite directions by pressing the mounting member 3 in the same opposite directions.

Furthermore, the mounting member 3 is displaced while interposing each of the driving projections 12 and 13 of the mounting member 3 between the piezoelectric displacement elements 9a and 9b ( 10a and 10b) on both sides thereof upon pressing the driving projection, so that the displacement can be adjusted with high precision, and the stability in a case where the displacement is fixed is improved. The reason for this is that the piezoelectric displacement element is not so formed that it can bear a too large tensile load but is so formed that it can bear a compressive load. The mounting member 3 may be integrally formed by including the driving projections 12 and 13, or the driving projections 12 and 13 may be separately formed. The pairs of piezoelectric displacement elements 9a and 9b and 10a and 10b are respectively provided in the fixed frames 5 and 7, so that the driving and fixing members 4 and 6 can be made compact as correcting means.

In the step of correcting the plane Wb serving as a second surface which is carried out after the inclination of the work surface Wa serving as a first surface relative to the X-Y plane is corrected, the mounting member 3 is rotated around the Z-axis. Particularly when the work surface Wa is corrected to be approximately parallel to the X-Y plane, therefore, the correction of the work surface Wa already adjusted is not affected by the correction of the plane Wb. Even if the correction is affected, the effect is at a level which can be substantially ignored, thereby making it possible to make highly precise corrections.

The correction of the work surface Wa previously made is released once to return the work surface Wa to a state before the correction, after which the plane Wb is corrected and, at the same time, the work surface Wa is returned to the above-mentioned previously corrected state. Since at the time of making the correction by one of the driving and fixing members 4 and 6, no unnecessary force is exerted on the other driving and fixing members, therefore, it is possible to make the correction in a state where the effect of the correction of one of the driving and fixing members on the correction of the other driving and fixing member is reliably avoided. As a result, it is possible to make more highly precise corrections and to lengthen the life of the driving and fixing members 4 and 6 serving as correcting means.

In the above-mentioned embodiment, after the inclination and the degree of parallelization are corrected through the step S7 or S8, the coordinates of each of the points $P_1$ to $P_5$ may be measured once again to confirm that the inclination of the work surface Wa and the degree of parallelization of the plane Wb are within the allowable ranges.

In the above-mentioned embodiment, corrections are made in two steps such that after correcting the inclination of the work surface Wa, the degree of parallelization of the plane Wb is corrected upon measuring the degree of parallelization, however, both the corrections can be simultaneously made by collectively measuring the coordinates of the five points $P_1$ to $P_5$ before the corrections. Strictly speaking, highly precise correction of the degree of parallelization cannot be made until the inclination of the work surface Wa is corrected, therefore the precision of the former correction is higher. On the other hand, the amount of correction itself is at a significantly low level. The effect of the correction of the inclination of the work surface Wa on the degree of parallelization of the plane Wb is at a level that may be substantially ignored; therefore, the latter simultaneous correction can be made.

Furthermore, the structures including the base 2, the driving and fixing members 4 and 6, and the mounting member 3 are formed into a unit as a position adjusting device 1, so that the unit can be easily applied to various types of machine tools, thereby improving versatility.

In the above-mentioned embodiment, the measurements of the coordinates for measuring an error in inclination and an error in the degree of parallelization are made using certain types of sensors provided in the machine tool 30 to simplify the construction of the position adjusting apparatus; however, the present invention is not limited to the same. For example, the coordinates may be measured using a known three-dimensional measuring device or the like apart from the machine tool, processed using a personal computer or the like, and inputted to a controller of the machine tool.

Figure 11A:
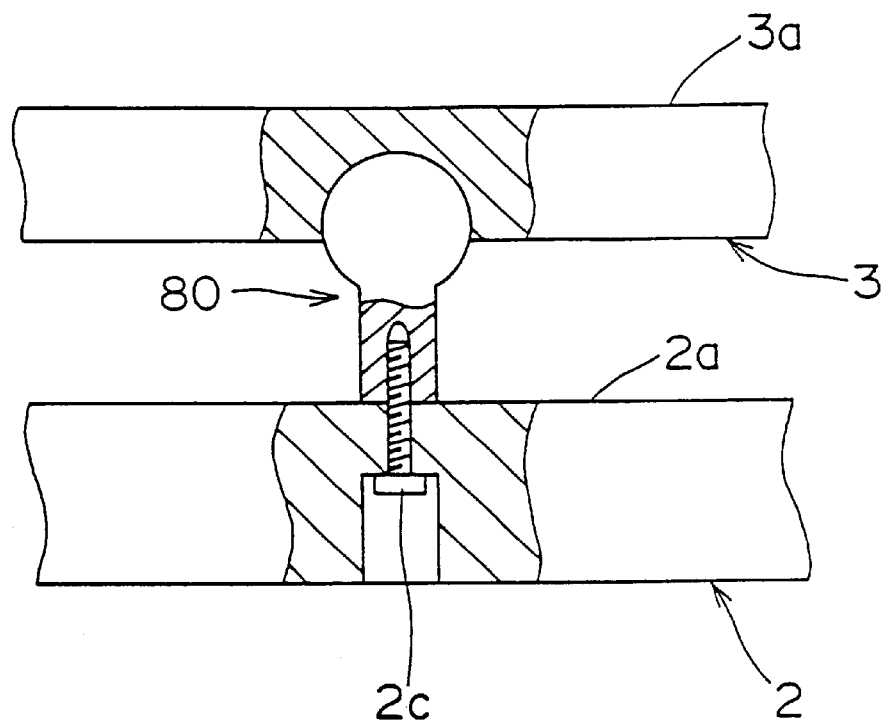
FIGS. 11A and 11B are a partially broken side view and a plan view of a principal part of a position adjusting apparatus according to another embodiment of the present invention, respectively.
Figure 11B:
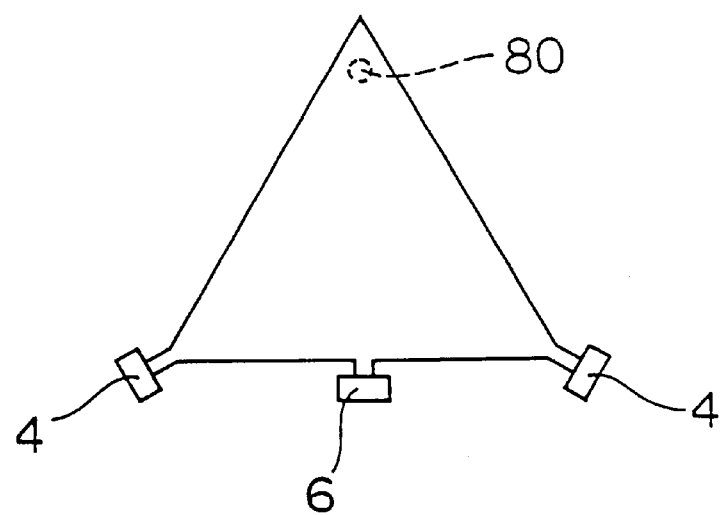

The roller bearing 8 in the above-mentioned embodiment can be replaced with a spherical bearing 80 as shown in FIG. 11A, to support a load in the Z-axis direction. In this case, as shown in FIG. 11B, the first driving and fixing members 4 may be arranged in at least two positions which are different from the position where the spherical bearing 80 is arranged, thereby making it possible to simplify the construction of the position adjusting apparatus. Further, the mounting member 3 can be supported by the spherical bearing 80 more stably. It is necessary that the positions where all the first driving and fixing members 4 are arranged and the position where the spherical bearing 80 is arranged are not on the same straight line.

As the form of arrangement of the first driving and fixing members 4, the first driving and fixing members 4 can be arranged at four corners of the mounting member 3, as shown in FIGS. 12A and 12B. In this case, pairs of first driving and fixing members 4 are respectively arranged on a pair of diagonal lines of the mounting member 3 in FIG. 12A, while pairs of first driving and fixing members 4 extending in the Y-axis direction and the reversed Y-axis direction are respectively arranged in FIG. 12B. In FIGS. 12A and 12B, the second driving and fixing members 6 are respectively arranged in central portions of a pair of opposite sides of the mounting member 3.

As shown in FIG. 12C, the first driving and fixing members 4 may be respectively provided in such positions as to divide the circumference centered around the center of the circular mounting member 3 into three approximately equal divisions, for example, and the second driving and fixing member 6 may be provided in one position on the circumference.

Figures 13A, 13B:
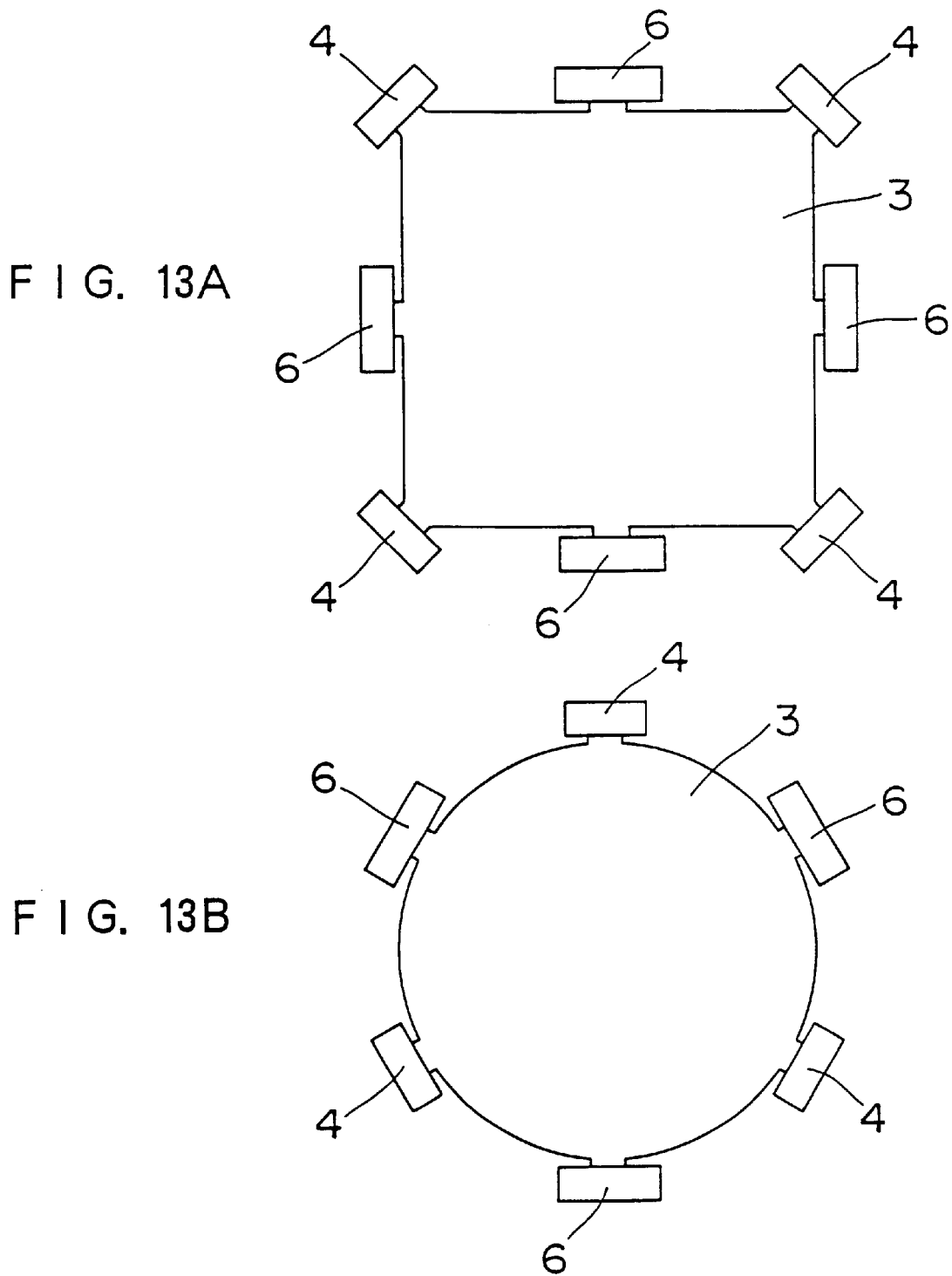
FIGS. 13A and 13B are schematic plan views of a position adjusting apparatus showing modified examples of the forms of arrangement of first and second driving and fixing members, respectively.

FIGS. 13A and 13B respectively illustrate still another embodiment of the present invention. The embodiment shown in FIG. 13A differs from the embodiment shown in FIG. 12A in that second driving and fixing members 6 are respectively arranged in central portions of the sides of the mounting member 3. The second driving and fixing members 6 are arranged in such positions as to divide the circumference centered around the center of the mounting member 3 into approximately equal divisions. The mounting member 3 can be rotatably supported equivalently by the second driving and fixing members 6. Rigidity which can withstand a cutting load in the horizontal direction is ensured by the second driving and fixing members 6 even if bearings are omitted, so that the mounting member 3 can be maintained in a stable position. Consequently, the structures of the roller bearing 8 and the spherical bearing 80 can be omitted, so that the construction of the position adjusting apparatus can be simplified.

The embodiment shown in FIG. 13B differs from the embodiment shown in FIG. 12C in that the second driving and fixing members 6 are respectively provided in such positions as to divide the circumference of the mounting member 3 into three equal divisions. Even if the second driving and fixing members 6 are thus arranged only in such positions as to divide the circumference of the mounting member 3 into three equal divisions, a position stabilized against the cutting load in the horizontal direction can be maintained. As a result, the construction of the position adjusting apparatus can be simplified by omitting the roller bearing 8 and the spherical bearing 80.

Figure 14:
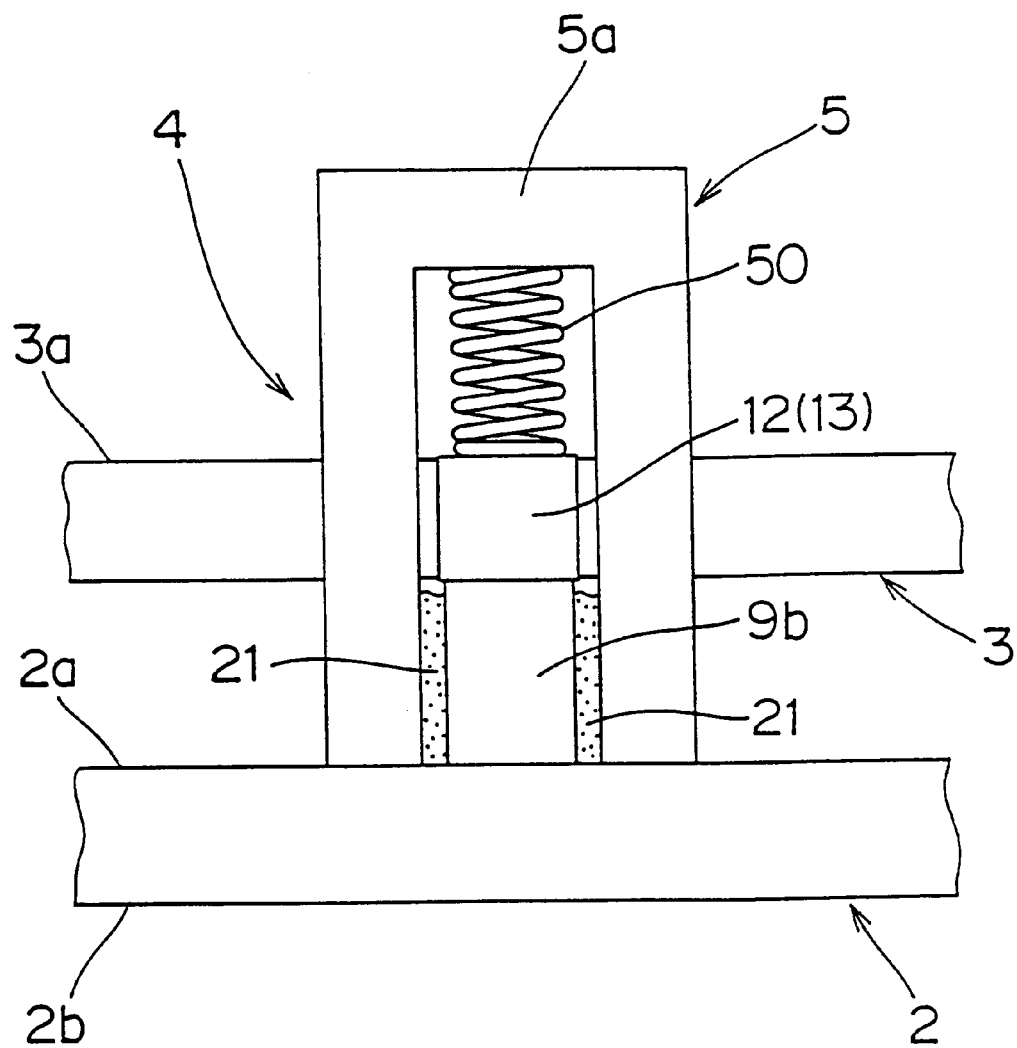
FIG. 14 is a side view of a principal part of a position adjusting apparatus according to still another embodiment of the present invention.

FIG. 14 illustrates still another embodiment. Referring to FIG. 14, in the present embodiment, one of a pair of piezoelectric displacement elements 9a and 9b with a driving projection 12 or 13 interposed therebetween is replaced with an elastic member, for example, a compressive coil spring 50. In this case, a voltage of only one of the piezoelectric displacement elements 9a and 9b may be controlled, so that the control thereof is simplified. The fabrication cost can be made low by reducing the number of piezoelectric displacement elements. Any elastic member can be used, provided that it can bear a required amount of displacement and a required load. For example, an elastic member of rubber or resin or the like can be used. Further, a spring made of a metal can be also used. A tensile coil spring can be used in addition to the above-mentioned compressive coil spring as a spring.

Figure 15:
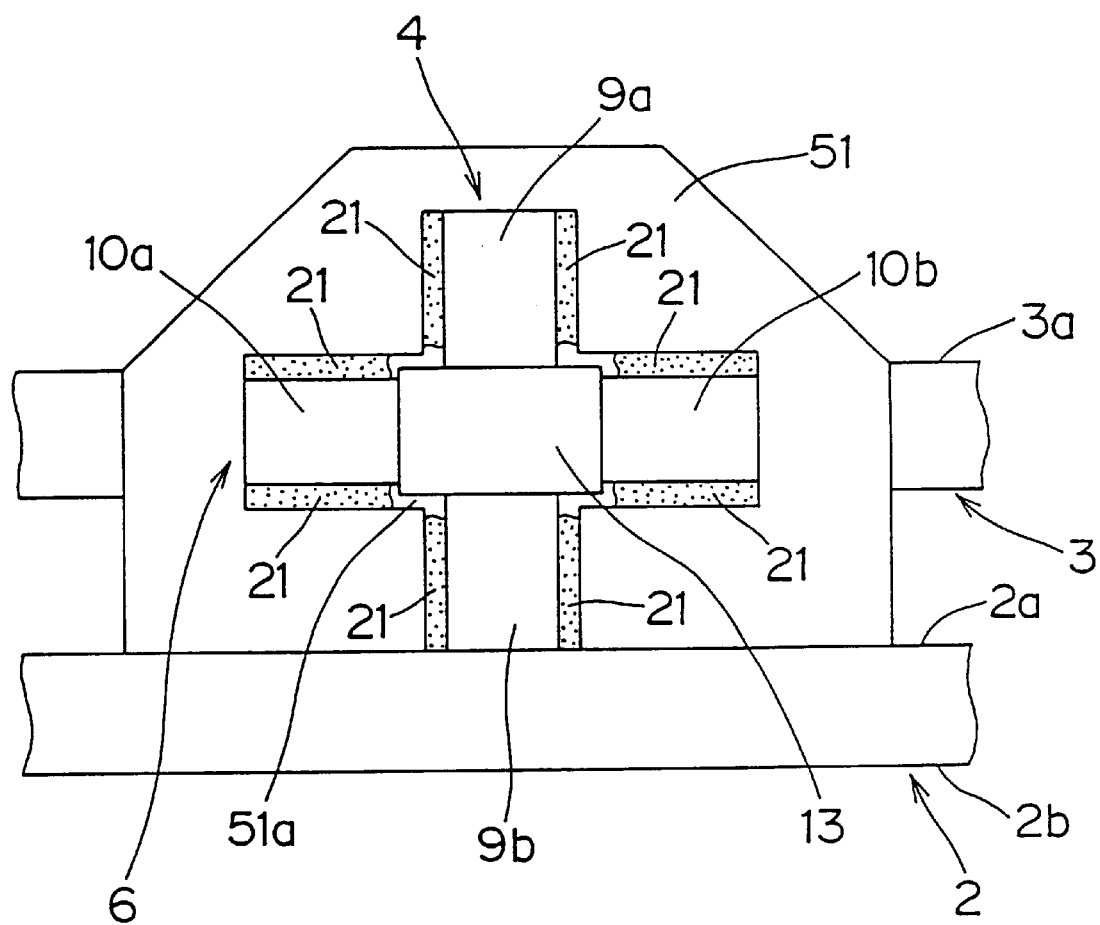
FIG. 15 is a side view of a principal part of a position adjusting apparatus according to still another embodiment of the present invention.

FIG. 15 illustrates still another embodiment. Referring to FIG. 15, in the present embodiment, each of pairs of first and second driving and fixing members 4 and 6 with a driving projection 13 interposed therebetween are arranged in a cross shape in one fixed frame 51 having a cross-shaped through hole 51a. In this case, the number of fixed frames 51 and the length of the driving projection 13 can be reduced, so that the entire position adjusting apparatus 100 can be made compact.

Figure 16:
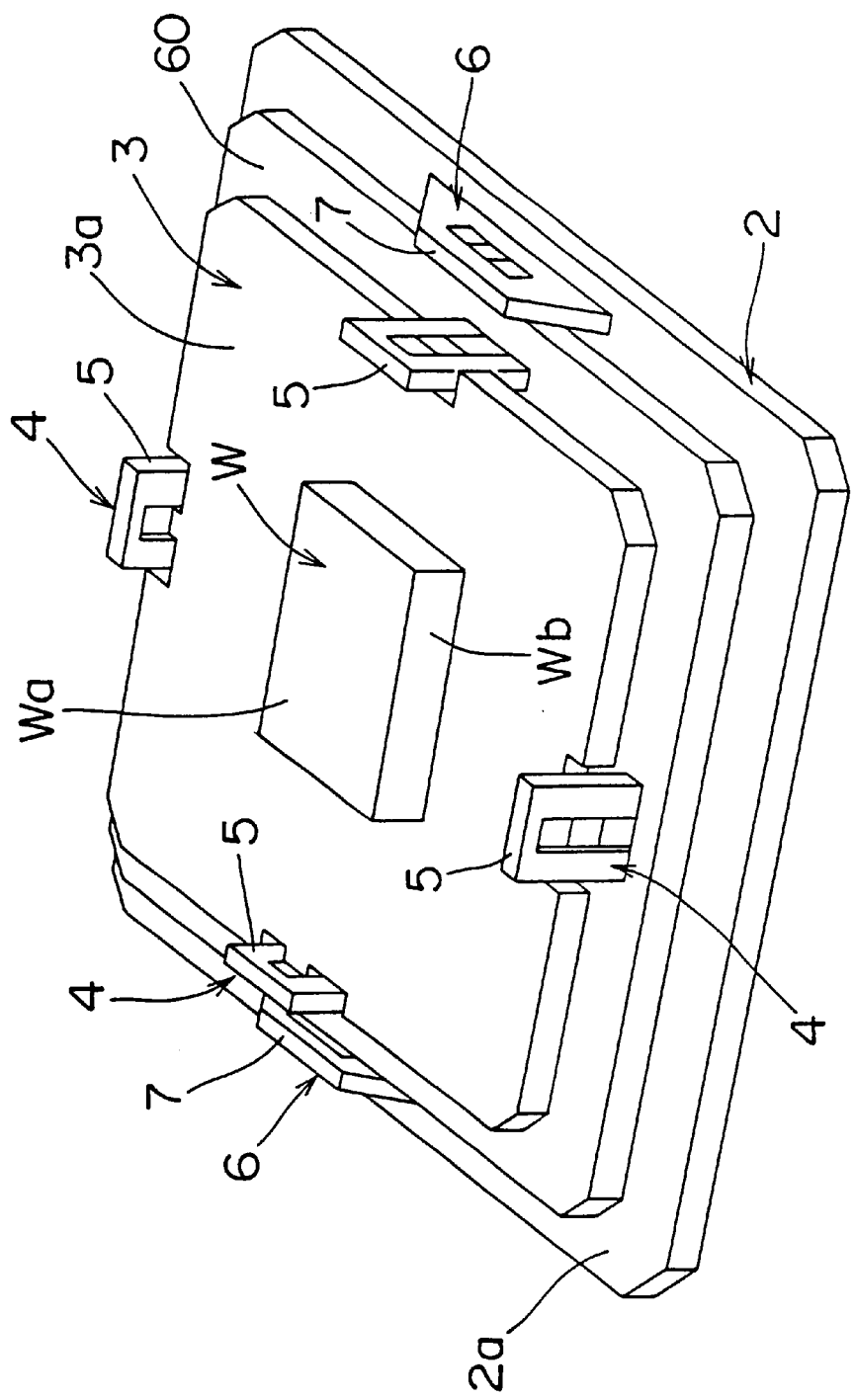
FIG. 16 is a schematic perspective view of a position adjusting apparatus according to still another embodiment of the present invention.

FIG. 16 illustrates still another embodiment. Referring to FIG. 16, the present embodiment differs from the embodiment shown in FIG. 2 in that an intermediate member 60 in a rectangular plate shape arranged parallel to a base 2 is provided between the base 2 and a mounting member 3, so that the position where the intermediate member 60 is rotated about the base 2 is adjusted by second driving and fixing members 6, and the inclination of a work surface Wa is adjusted by first driving and fixing members 4 for supporting the mounting member 3 on the intermediate member 60 (whose construction is the same as that in the embodiment shown in FIG. 2). The intermediate member 60 may be directly put on an upper surface 2a of the base 2, or may be supported on the base 2 through a slide bearing such as a needle roller bearing. Further, a fixed frame 5 of the first driving and fixing member 4 is fixed to the intermediate member 60, and a fixed frame 7 of the second driving and fixing member 6 is fixed to the base 2.

In the present embodiment, the inclination of the mounting member 3 is adjusted with respect to the relationship between the mounting member 3 and the intermediate member 60, and the position where the mounting member 3 is rotated is adjusted with respect to the relationship between the intermediate member 60 and the base 2, so that respective adjustments by the driving and fixing members 4 and 6 can be made in a state where they are completely independent of each other.

Figure 17:
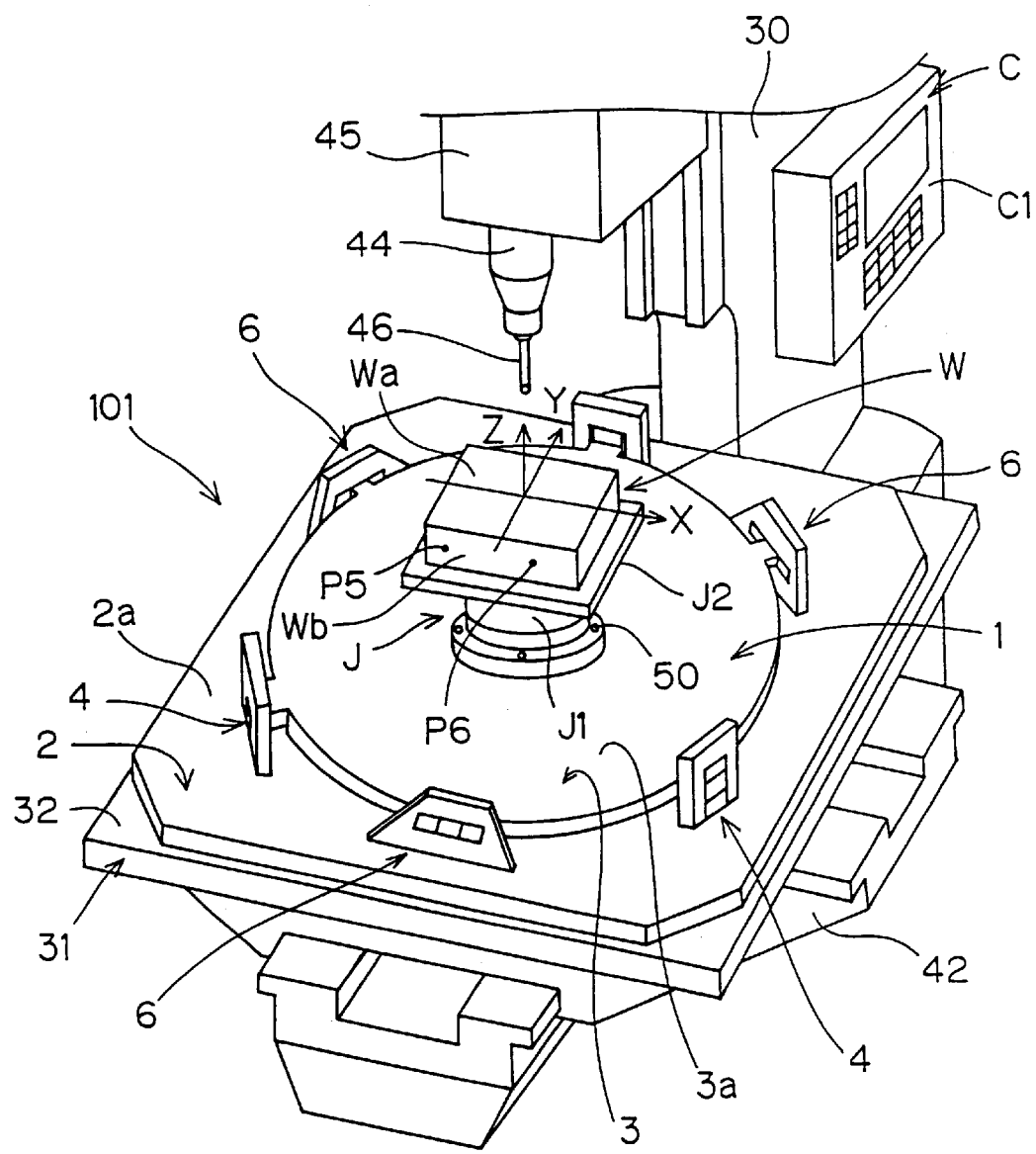
FIG. 17 is a schematic perspective view of a machine tool including a position adjusting apparatus according to still another embodiment of the present invention.
Figure 19:
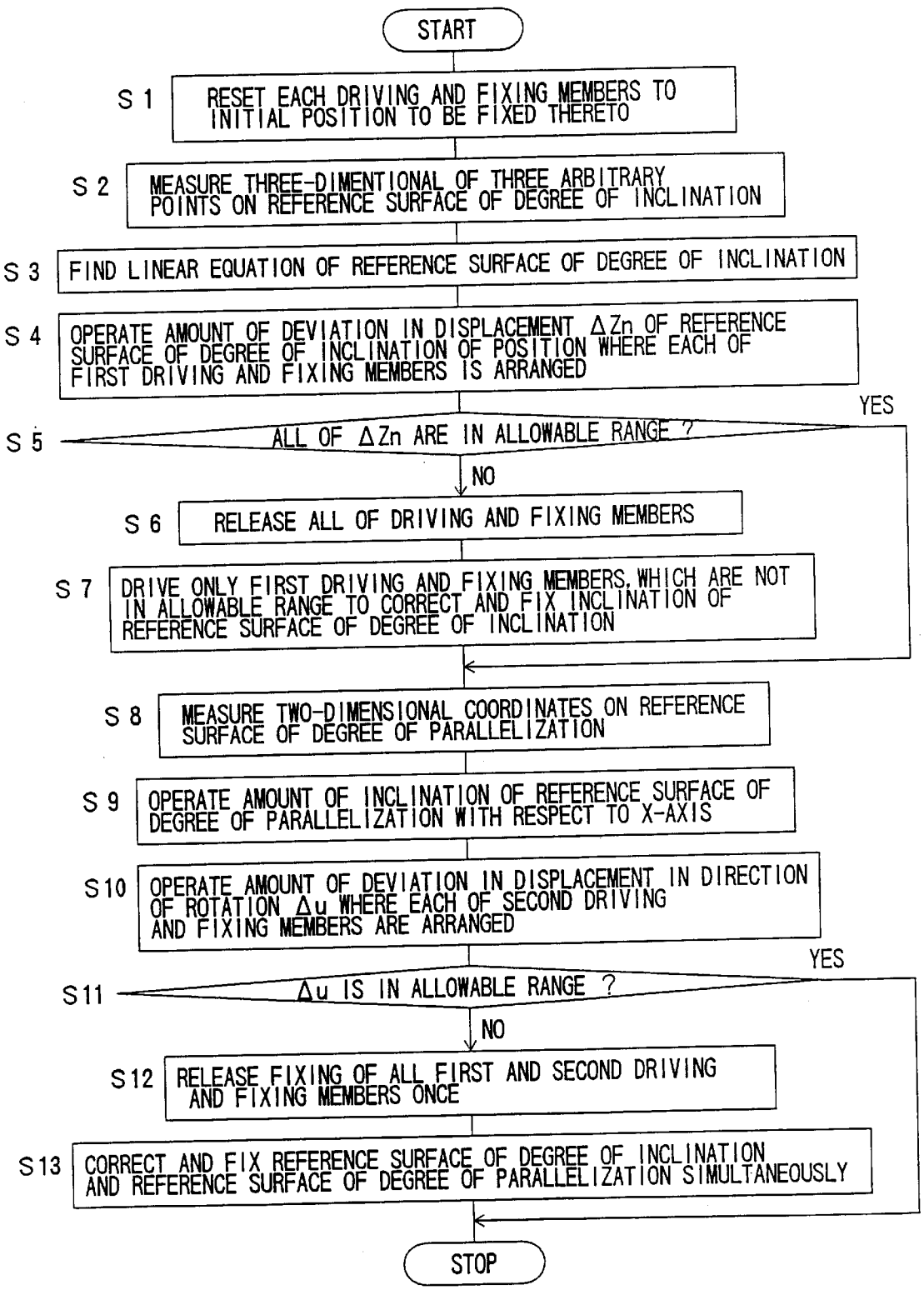
FIG. 19 is a flow chart showing the procedure for position adjustment.

Referring now to FIGS. 17 to 19, another embodiment of the present embodiment will be described. Referring to FIG. 17, a work W is carried on a work table 31 of a machine tool 30 through a position adjusting device 1 in a work position adjusting apparatus 101 (hereinafter merely referred to as a position adjusting apparatus 101). First driving and fixing members 4 are provided in such positions as to divide the circumference of a circular mounting member 3 into three approximately equal divisions. Similarly, second driving and fixing members 6 are provided in such other positions as to divide the circumference of the mounting member 3 into three approximately equal divisions.

The form of arrangement of each of the driving and fixing members in the present embodiment corresponds to that in the above-mentioned embodiment shown in FIG. 13B. Each of the first and second driving and fixing members 4 and 6 is constituted by a pair of piezoelectric displacement elements arranged opposite to each other with a predetermined portion of the mounting member 3 interposed therebetween. The form of arrangement of the piezoelectric displacement elements in each of the driving and fixing members 4 and 6 is the same as that in the embodiment shown in FIG. 1.

The work W is carried on the mounting member 3 through a centering positioning jig J serving as a work position adjusting device. Referring to FIG. 17, and to FIG. 18 that is a side view of the position adjusting device 1, an upper surface 32 of the work table 31 is parallel to an X-Y motion plane, that is, an X-Y plane 52 of a machine. Further, an upper surface 2a of the base 2 in the position adjusting device 1 located on the work table 31 is also parallel to the X-Y plane 52.

A main body J1 of the centering positioning jig J is clamped and fastened to an approximately central portion of the mounting member 3 by a bolt 50, and a work base J2 on which the work W is put is inserted into a fitting hole (not shown) of the main body J1 by a fitting axis (not shown), so that the work W is in a predetermined position with respect to the mounting surface 3a of the mounting member 3. Since the other structures are the same as those in the embodiment shown in FIG. 1, the same reference numerals are assigned to the structures and hence, the description thereof is not repeated.

The procedure for processing in the present embodiment will be described on the basis of a flow chart shown in FIG. 19.

When processing is started, the first and second driving and fixing members 4 and 6 are first reset to their initial positions and are fixed to the positions (step S1). The initial positions are respectively set in central positions within the respective maximum ranges of correction made by the driving and fixing members 4 and 6. By resetting the first driving and fixing members 4, a reference surface of the degree of inclination Zw which is composed of an upper surface Wa of the work W or a virtual plane parallel thereto (see FIG. 18) and a work mounting surface 3a of the mounting member 3 are approximately parallel to a virtual plane to be a target, for example, the X-Y plane 52. Further, a reference surface of the degree of parallelization Wb of the work W is approximately parallel to a target axis, for example, to the X-axis by resetting the second driving and fixing members 6.

The three-dimensional coordinates of three arbitrary points on the reference surface of the degree of inclination Zw of the work W are then measured and are stored in a memory (step S2). The degree of inclination in the X-axis direction a1 and the degree of inclination in the Y-axis direction b1 of the reference surface of the degree of inclination Zw are operated using the measured three-dimensional coordinates of the three points, whereby the following linear equation of the reference surface of the degree of inclination Zw is found (step S3):

$$Z = a1 \cdot X + b1 \cdot Y + c1 \quad (11)$$

The following deviation equation (13) between the following linear equation (12) of a virtual plane Zr previously set to be a target for correcting the reference surface of the degree of inclination Zw and the foregoing equation (11) of the reference surface of the degree of inclination Zw is then found:

$$Z = a2 \cdot X + b2 \cdot Y + c2 \quad (12)$$

$$\Delta Z = (a1-a2)X + (b1-b2)Y + (c1-c2) \quad (13)$$

The X and Y coordinates (x1n, y1n) of a position 53 (see FIG. 18) where each of the first driving and fixing members 4 is arranged are substituted into the deviation equation (13), to find an amount of deviation in displacement $\Delta Zn$ indicating how much the plane Zw deviates from the plane Zr in the Z-axis direction in an XY coordinate position of the first driving and fixing member 4 (step S4):

$$\Delta Zn = (a1-a2)x1n + (b1-b2)y1n + (c1-c2) \quad (14)$$

If the virtual plane Zr which is previously set to be a target is an X-Y plane (a plane where a linear equation Z=0), a value of $\Delta Zn$ is given by the following equation (15) because a2, b2 and c2 are zero in the equation (14):

$$\Delta Zn = a1 \cdot x1n + b1 \cdot y1n + c1 \quad (15)$$

When an absolute value $|\Delta Zn|$ of at least one of the found amounts of deviation in displacement $\Delta Zn$ ($\Delta Z1$, $\Delta Z2$, $\Delta Z3$) exceeds an allowable value m, that is, at least one of the amounts of deviation in displacement $\Delta Zn$ departs from an allowable range ($\Delta Zn < -m$, or $m < \Delta Zn$), the fixing of all the first and second driving and fixing members 4 and 6 is released once (step S6), after which only the first driving and fixing member 4 in which the amount of deviation in displacement departs from the allowable range is driven to correct the inclination of the reference surface of the degree of inclination Zw and fix the corrected inclination (step S7). At this time, an amount of correction Hn required in the Z-axis direction is expressed by the following equation (16):

$$Hn = -\Delta Zn \quad (16)$$

That is, the first driving and fixing member 4 to be corrected is driven in a direction opposite to the direction in which a deviation in displacement occurs so that the deviation in displacement is eliminated to fix the first driving and fixing member 4 to the corrected position.

As a result, when the amount of deviation in displacement $\Delta Zn$ is positive, it is corrected by an amount of correction $|\Delta Zn|$ in a reversed Z-axis direction. When the amount of deviation in displacement $\Delta Zn$ is negative, it is corrected by an amount of correction $|\Delta Zn|$ in the Z-axis direction.

In making the correction in the step S7, the fixing of all the driving and fixing members 4 and 6 is released in the previous step S6. That is, the fixing of the second driving and fixing members 6 and the first driving and fixing members 4 requiring no correction (the amount of deviation in displacement $\Delta Zn$ is within the allowable range) is released once, and the second driving and fixing members 6 and the first driving and fixing members 4 requiring no correction are set again to states before the release and are fixed simultaneously with the correction of the first driving and fixing member 4 to be corrected.

On the other hand, when all amounts of deviation in displacement $\Delta Zn$ are within the allowable range (that is, $-m \leq \Delta Zn \leq m$), the program proceeds to the subsequent step S8 without passing through the steps S6 and S7 for correcting the degree of inclination.

In the step S8, two-dimensional X and Y coordinates (x4, y4) and (x5, y5) of two arbitrary points $P_4$ and $P_5$ on the reference surface of the degree of parallelization Wb of the work W are measured, and the measured coordinates are stored. An inclination (corresponding to the degree of parallelization) ex of the reference surface of the degree of parallelization Wb with respect to the target axis, for example, the X-axis is then operated using the measured two-dimensional coordinates using the following equation (17) (step S9):

$$ex = (y4-y5)/(x4-x5) \quad (17)$$

Letting D2 be the distance between each of the second driving and fixing members 6 and the rotation center of the mounting member 3, a displacement in the direction of rotation Uw of the work which is converted to the position of the second driving and fixing member 6 is as follows:

$$Uw = ex \cdot D2 \quad (18)$$

Letting Ur be a displacement in a target position, an amount of deviation in displacement in the direction of rotation $\Delta U$ is as follows:

$$\Delta U = Uw - Ur \quad (19)$$

If the position is so adjusted that the reference surface of the degree of parallelization Wb is parallel to the X-axis, the amount of deviation in displacement in the direction of rotation $\Delta U$ is Uw since Ur=0.

An absolute value $|\Delta U|$ of the found amount of deviation in displacement in the direction of rotation $\Delta U$ exceeds an allowable value n, that is, the amount of deviation in displacement in the direction of rotation $\Delta U$ departs from an allowable range ($\Delta U < -n$, or $n < \Delta U$), the fixing of all the first and second driving and fixing members 4 and 6 is released once, after which the degree of inclination and the degree of parallelization are simultaneously corrected to fix the second driving and fixing members 4 and 6 to the corrected inclination (steps S11, S12, and S13).

At this time, in order to correct the degree of parallelization, an amount of correction in the direction of rotation L required in a clockwise direction centered around the Z-axis is expressed by the following equation:

$$L = -\Delta U \quad (20)$$

That is, each of the second driving and fixing members 6 is driven in a direction opposite to the direction in which a deviation in displacement in the direction of rotation occurs so as to eliminate the deviation in displacement in the direction of rotation and fix the displacement, after which the processing is terminated.

As a result, when the amount of deviation in displacement in the direction of rotation $\Delta U$ is positive, it is corrected by the amount of correction in the direction of rotation $|\Delta U|$ in a clockwise direction. When the amount of deviation in displacement in the direction of rotation $\Delta U$ is negative, it is corrected by the amount of correction $|\Delta U|$ in a counter-clockwise direction.

On the other hand, when the amount of deviation in displacement in the direction of rotation $\Delta U$ is within the allowable range (that is, $-n \leq \Delta U \leq n$), the processing is terminated without making the correction in the steps S12 and S13.

In correcting the degree of parallelization (the correction of the displacement in the direction of rotation) in the step S13, the fixing of all the driving and fixing members 4 and 6 is released once in the previous step S12. That is, the fixing of the first driving and fixing members 4 already set is released once, and the first driving and fixing members 4 are set again to states before the release and are fixed simultaneously with the correction of the degree of parallelization by the second driving and fixing members 6.

In the present embodiment, the work can be corrected to a desirable mounting position with high precision, quickly and automatically and therefore, the necessity of human intervention for adjustment can be eliminated as in the embodiment shown in FIG. 1. As a result, it is possible to cope with the automation of the preparation of the adjustment. Further, the following advantages are obtained.

The correction is always started from a predetermined position already known by first resetting each of the driving and fixing members 4 and 6 to its initial position before starting the correction. The present position need not be examined every time the correction is started, so that the correction can be made more quickly. Moreover, the initial position is the central position within the maximum range of correction (a so-called dynamic range) made by each of the driving and fixing members 4 and 6, so that the control of the correction is simplified. As a result, the correction can be made more quickly.

In the embodiment shown in FIG. 1, the correction is so made that the reference surface of the degree of inclination which is composed of the work surface Wa conforms to the X-Y plane which is a target, and the reference surface of the degree of parallelization which is composed of the plane Wb conforms to the Z-X plane which is a target. On the other hand, in the present embodiment, the targets need not necessarily be the X-Y plane and the Z-X plane. For example, the present embodiment can be carried out using planes inclined at predetermined angles from the planes as targets, so that the versatility is high from this point of view.

In the embodiment shown in FIG. 1, the first and second driving and fixing members 4 and 6 are respectively arranged along the X-axis and the Y-axis, the present embodiment can be carried out even if the driving and fixing members 4 and 6 respectively deviate from the axes; therefore, the versatility is high also from this point of view.

Furthermore, an amount of correction required by the first driving and fixing member 4 can be quickly found without executing a complicated operation using the deviation equation between the linear equations and the X and Y coordinates in the position where the first driving and fixing member 4 is arranged. Further, the position where the first driving and fixing member 4 is arranged may be any position, so that the degree of freedom of the arrangement is increased.

In the foregoing step S3, the amount of deviation in displacement $\Delta Zn$ of the reference surface of the degree of inclination Zw from the target plane Zr in the position of the first driving and fixing member 4 may be found by substituting the coordinates of the first driving and fixing member 4 into the deviation equation between the equations of both the planes Zw and Zr, or may be found by substituting the coordinates of the first driving and fixing member 4 into the respective linear equations of the planes Zw and Zr to find respective Z values, and then calculating the difference therebetween.

Even if the reference surface of the degree of inclination Zw is so corrected as to conform to the target plane inclined at a predetermined angle (for example, 1° to 2°) relative to the X-Y plane 52, and is then so corrected as to match the degree of parallelization upon being rotated around the Z-axis, the degree of inclination previously matched is hardly affected practically. When it is desired to also eliminate a significantly small amount of deviation which may be caused by the affect, it can be reliably eliminated by repeating the steps S2 to S13 a plurality of numbers of times in the flow chart shown in FIG. 19. Examples of a case where the reference surface is inclined from the X-Y plane 52 as described above include a case where a surface having a draft angle of a molding die is worked.

Meanwhile, description is made of a case where the position of the apparatus according to the embodiment shown in FIG. 2 is adjusted using the flow chart in the present embodiment. In the apparatus shown in FIG. 2, the first driving and fixing members 4 are arranged along the X-axis and the Y-axis, respectively. That is, the respective X and Y coordinates of the first driving and fixing members 4 are represented by (x11, 0), (x12, 0), (0, y11), and (0, y12). Therefore, amounts of deviation in displacement $\Delta Zn$ in the positions where the first driving and fixing members 4 are arranged are obtained by substituting the coordinates of the first driving and fixing members 4 into a linear equation Z=aX+bY, as follows:

$$\Delta Z1 = ax11, \Delta Z2 = ax12, \Delta Z3 = by11, \Delta Z4 = by12 \quad (21)$$

It is assumed that the Z-axis penetrates the center of the mounting member 3. In this case, letting D1 be the distance between each of the first driving and fixing members 4 and the central axis of the mounting member 3, the following equation holds:

$$|x11| = |x12| = |y11| = |y12| = D1 \quad (22)$$

Consequently, the amounts of deviation in displacement are as follows:

$$\Delta Z1 = -aD1, \Delta Z2 = aD1, \Delta Z3 = -bD1, \Delta Z4 = bD1 \quad (23)$$

As a result, the operation is simplified.

In this case, in the step S4 in the flow chart shown in FIG. 19 (the step of finding the amount of deviation in displacement $\Delta Zn$), the degree of inclination in the X-axis direction a1 and the degree of inclination in the Y-axis direction b1 of the plane Zw and the distance D1 between each of the first driving and fixing members 4 and the rotation center of the mounting member 3 are multiplexed instead of substituting the X and Y coordinates of each of the first driving and fixing members 4 into the linear equation of the plane Zw. At this time, a positive sign is added to D1 with respect to the first driving and fixing member 4 which is positive on the X-axis and the Y-axis, while a negative sign is added to D1 with respect to the first driving and fixing member 4 which is negative on the X-axis and the Y-axis.

FIG. 20 shows the flow of processing in still another embodiment of the present invention. Referring to FIG. 20, the present embodiment differs from the embodiment shown in FIG. 19 in that the coordinates of a reference surface of the degree of inclination and a reference surface of the degree of parallelization are measured (steps S2 and S3), and each of amounts of deviation in displacement $\Delta Zn$ and $\Delta U$ is then determined (steps S4 to S7), after which the inclinations of the reference surface of the degree of inclination and the reference surface of the degree of parallelization are collectively corrected (steps S8 to S10). The steps S1, S2, S3, S4, S5, S6, and S7 in the present embodiment respectively correspond to the steps S1, S2, S8, S3, S4, S9, and S10 in the embodiment shown in FIG. 19. The steps S9 and S10 in the present embodiment respectively correspond to the steps S12 and S13 in the embodiment shown in FIG. 19.

In the present embodiment, both the corrections are collectively made, so that the corrections can be quickly made. When the corrections are simultaneously made, an affect of each of the corrections of the degree of inclination and the degree of parallelization on the other correction is at a level which can be almost ignored practically. It can be said that the precision of the corrections is hardly affected. Further, the steps S2 to S10 are repeated a plurality of times, so that the precision of the adjustment can be improved.

The present invention is not limited to each of the above-mentioned embodiments. The present invention is applicable to not only a machine tool for performing cutting work such as an NC milling cutter but also all machine tools requiring highly precise setting of the position of a work, for example, an electrical discharge machine.

As the first and second driving and fixing members 4 and 6, piezoelectric displacement elements can be replaced with supermagnetostrictive elements. Examples of the supermagnetostrictive elements include a rare earth magnetic material having large magnetostriction, for example, a Tb-Dy-Fe alloy. The supermagnetostrictive element can be used without any cable because it produces a displacement in noncontact depending on the change in an external magnetic field. Further, the supermagnetostrictive element has a larger output and a larger displacement, as compared with a piezoelectric displacement element, and the weight thereof per unit stress is small. When the supermagnetostrictive elements are used, therefore, a sufficiently large amount of displacement can be ensured even if they are made small in size, and the position of the work can be stably maintained upon withstanding a larger cutting load.

Furthermore, it is also possible to replace the piezoelectric displacement elements with fluid pressure cylinders using fluid pressure such as oil pressure. Further, it is also possible to use elements capable of controlling an amount of displacement by adjusting the temperature.

In the embodiments shown in FIGS. 19 and 20, each of the driving and fixing members 4 and 6 is first reset to a central position in the maximum range of correction which is its initial position before the position of the work is adjusted. That is, although a work mounting surface is so set as to be approximately parallel to an X-Y plane with the degree of inclination thereof taken as approximately zero, it is not limited to the same. It may previously have a predetermined degree of inclination as required. Further, when the correction allowable range of the driving and fixing member is sufficiently larger than the amount of displacement, for example, the adjustment of the position may be started from an arbitrary position without determining a predetermined initial position as in the embodiment shown in FIG. 10, for example.

Furthermore, in each of the above-mentioned embodiments, in performing each of the corrections of the degree of inclination and the degree of parallelization, the fixing of the driving and fixing member requiring no correction is also released once, and the driving and fixing member is reset to a state before the release and is fixed simultaneously with the correction. This is for the following reason. That is, each of the driving and fixing members is constructed using piezoelectric displacement elements. Unless the fixing of the driving and fixing member which is not related to the correction is released once, therefore, an excessive external force may be applied to the piezoelectric displacement element, to shorten the structural life thereof. When the structural life may not be shortened by the characteristics of the driving and fixing member used, the conditions of specifications, and the like, the fixing of the driving and fixing member which is not related to the correction need not necessarily be released once.

In each of the embodiments, a series of adjusting steps may be carried out a plurality of times in order to increase the accuracy of an adjusted position.

Although the touch sensor is used for measuring coordinates in each of the embodiments, the present invention is not limited to the same. For example, an electric micrometer can be also used. Further, the present invention is not limited to a sensor of a contact type. It is also laser or the like provided outside a machine tool.

Although the controller C of the machine tool carries out the control of the position adjusting apparatuses 100 and 101 in each of the embodiments, the present invention is not limited to the same. Each of the position adjusting apparatuses 100 and 101 may include a personal computer for inputting a signal from signal outputting means such as a touch sensor, determining an amount of correction, and controlling the driving of each of driving and fixing members. In this case, signals are exchanged between the personal computer and the controller of the machine tool in order to measure coordinates.

In addition thereto, various changes can be made in the range of the present invention.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A work position adjusting apparatus for adjusting a position of a work having first in second surfaces in crossing planes, based upon mutually perpendicular first, second and third axes of a machine tool, the adjusting with respect to a relative motion between a tool head and a work table, the apparatus comprising:

a base;

a mounting member on which the work is mounted;

support means, interposed between the base and the mounting member, for supporting the mounting member, the supporting means comprising first correcting means for correcting the inclination of the first surface relative to a plane including the first and second axes by driving the mounting member in a direction parallel to the third axis, and second correcting means for correcting the inclination of the second surface relative to the first axis by rotating the mounting member around an axis parallel to the third axis;

a frame defining a space;

a moveable member connected between the mounting member and the base, moveable relative to the frame in the space, wherein at least one of the first and second correcting means includes a pair of driving elements for driving the mounting member in opposite directions, the pair of driving elements disposed in the frame on opposite sides of the moveable member so that the moveable member is interposed therebetween, the driving elements displacing the frame relative to the moveable member so as to displace the mounting member relative to the base;

coordinate value detecting means for detecting coordinate values related to an inclination of the first surface relative to a plane including the first and second axes and an inclination of the second surface relative to the first axis; and controlling means for controlling an operation of each of the correcting means in response to a signal from the coordinate value detecting means.

2. The work position adjusting apparatus according to claim 1, wherein the coordinate value detecting means comprises:
   signal outputting means, moveable with the tool head to be brought into contact with each of the first and second surfaces, for outputting a signal to the controlling means, and
   three displacement sensors for detecting displacements with respect to the first, second and third axes, respectively.

3. The work position adjusting apparatus according to claim 1, wherein each of the correcting means comprises means for locking the mounting member with each of the first and second surfaces of the work in a corrected position.

4. The work position adjusting apparatus according to claim 1, wherein
   the supporting means further comprises rotatably supporting means for rotatably supporting the mounting member around the axis parallel to the third axis in a state that the mounting member is moveable in a direction along the axis parallel to the third axis, and
   the first correcting means is arranged in at least three different positions each spaced apart from the axis parallel to the third axis.

5. The work position adjusting apparatus according to claim 1, wherein
   the supporting means further comprises a spherical bearing rotatably supporting the mounting member around a predetermined point, and
   the first correcting means is arranged in at least two different positions each spaced apart from the spherical bearing.

6. The work position adjusting apparatus according to claim 1, wherein the driving element comprises a piezoelectric displacement element for displacing the mounting member in response to an applied voltage.

7. The work position adjusting apparatus according to claim 1, wherein the driving element includes a supermagnetostrictive element for displacing the mounting member according to the change in a magnetic field.

8. The work position adjusting apparatus according to claim 1, wherein
   the supporting means further comprises an intermediate member interposed between the base and the mounting member, and
   one of the first and second correcting means is interposed between the mounting member and the intermediate member and corrects a displacement of the mounting member from the intermediate member, and the other correcting means is interposed between the intermediate member and the base and corrects a displacement of the intermediate member from the base.

9. A work position adjusting apparatus according to claim 1, wherein in the space defined by the frame is a cross-shaped space, the moveable member is disposed at substantially the center of the cross-shaped space, and both of the first and second correcting means includes a pair of driving elements in the cross-shaped space.

10. A work position adjusting apparatus according to claim 9, wherein the pair of driving elements of the first correcting means are disposed on first opposite sides of the moveable member and the pair of driving elements of the second correcting means are disposed on second opposite sides of the moveable member.

11. A work position adjusting apparatus according to claim 1, wherein the pair of driving elements are piezoelectric displacement elements or supermagnetostrictive elements, each having a side portion parallel to a driving direction, further comprising an elastic layer fixing the side portion of each driving element to the frame.

12. A work position adjusting apparatus according to claim 1, wherein the elastic layer has an adhesive.

13. A method of adjusting a position of a work set in machine tool between a tool head and a work table, the method comprising:
   a. providing a base in the work table;
   b. supporting a mounting member on the base with a support structure;
   c. mounting the work on the mounting member;
   d. detecting first coordinate values related to an inclination of a first surface of the work relative to a plane containing mutually perpendicular first and second axes of the machine tool;
   e. correcting the inclination of the first surface with the support structure, based upon the detected first coordinate values;
   f. detecting second coordinate values related to an inclination of a second surface of the work in a plane crossing a plane of the first surface, relative to the first axis; and
   g. rotating the mounting member around an axis parallel to a third axis of the machine tool, with the support structure, based upon the detected second coordinates, so as to correct the inclination of the second surface, the third axis being perpendicular to both the first axis and the second axis;
   at least one of said steps e and g including driving the mounting member in one of two opposite directions relative to the base with one of two driving elements disposed in a frame on opposite sides of a moveable member connected to the mounting member, the moveable member interposed between the two driving members in a space defined by the frame so that the one driving member drives the moveable member relative to the frame so as to drive the mounting member therewith.

14. The work position adjusting method according to claim 13, wherein
   in the step of correcting the inclination of the first surface, an amount of correction made by the first correcting means is found based upon a deviation equation obtained from both a first equation $Z=a1 \cdot X+b1 \cdot Y+c1$ and a second equation $Z=a2 \cdot X+b2 \cdot Y+c2$ and coordinate values related to the first and second axes in a position where the first correcting means is arranged,
   the first equation represents the first surface or a virtual plane parallel thereto which is found based upon the coordinate values related to the inclination of the first surface which are detected respectively using the first, second and third axes as the X-axis, the Y-axis and the Z-axis and the second equation represents a virtual plane to be a target which is previously set.

15. The work position adjusting method according to claim 13, wherein
   the step of correcting the inclination of the second surface is carried out after the step of correcting the inclination of the first surface.

16. The work position adjusting method according to claim 13, wherein out of the step of correcting the inclination of the first surface and the step of correcting the inclination of the second surface, the correction in the former step is released once, and is carried out again at the same time that the correction in the latter step is carried out.

17. The work position adjusting method according to claim 13, wherein
the step of correcting the inclination of the first surface and the step of correcting the inclination of the second surface are simultaneously carried out.

18. The work position adjusting apparatus according to claim 13, further comprising the step of resetting the position where each of the correcting means is operated to a corresponding initial position is included before the steps of detecting the coordinate values related to the inclinations of the first and second surfaces.

19. The work position adjusting apparatus according to claim 18, wherein the initial position is a central position within a maximum range of correction made by each of the correcting means.

20. A work position adjusting apparatus according to claim 19, wherein the moveable member is connected to the mounting member.

21. A work position adjusting apparatus for adjusting a position of a work having first in second surfaces in crossing planes, based upon mutually perpendicular first, second and third axes of a machine tool, the adjusting with respect to a relative motion between a tool head and a work table, the apparatus comprising:
a base;
a mounting member on which the work is mounted;
support means, interposed between the base and the mounting member, for supporting the mounting member, the supporting means comprising first correcting means for correcting the inclination of the first surface relative to a plane including the first and second axes by driving the mounting member in a direction parallel to the third axis, and second correcting means for correcting the inclination of the second surface relative to the first axis by rotating the mounting member around an axis parallel to the third axis;
a frame defining a space;
a moveable member connected between the mounting member and the base, moveable relative to the frame in the space, wherein at least one of the first and second correcting means includes a driving element and an elastic member for driving the mounting member in respective opposite directions, the driving element and the elastic member disposed in the frame on opposite sides of the moveable member so that the moveable member is interposed therebetween, the driving element and the elastic member displacing the frame relative to the moveable member so as to displace the mounting member relative to the base;
coordinate value detecting means for detecting coordinate values related to an inclination of the first surface relative to a plane including the first and second axes and an inclination of the second surface relative to the first axis; and
controlling means for controlling an operation of each of the correcting means in response to a signal from the coordinate value detecting means.

22. A work position adjusting apparatus according to claim 1, wherein
the moveable member is connected to the mounting member.

23. A work position adjusting apparatus for adjusting a position of a work having first in second surfaces in crossing planes, based upon mutually perpendicular first, second and third axes of a machine tool, the adjusting with respect to a relative motion between a tool head and a work table, the apparatus comprising:
a base;
a mounting member on which the work is mounted;
supporting means, interposed between the base and the mounting member, for supporting the mounting member, the supporting means comprising first correcting means for correcting the inclination of the first surface relative to a plane including the first and second axes by driving the mounting member in a direction parallel to the third axis, and second correcting means for correcting the inclination of the second surface relative to the first axis by rotating the mounting member around an axis parallel to the third axis, at least one of the first and second correcting means including a pair of driving elements for driving the mounting member in opposite directions, the pair of driving elements opposing each other on opposite sides of a portion of the mounting member interposed therebetween, the driving elements including a pair of piezoelectric displacement elements, further comprising means supplying to each of the piezoelectric displacement elements an overdrive voltage having a bias voltage increased or decreased in proportion to the amount of a displacement of each of the pair of piezoelectric displacement elements, wherein the bias voltage is zero when the displacement of the piezoelectric elements is zero, the bias voltage correcting a residual displacement of each piezoelectric displacement element;
coordinate value detecting means for detecting coordinate values related to an inclination of the first surface relative to a plane including the first and second axes and an inclination of the second surface relative to the first axis; and
controlling means for controlling an operation of each of the correcting means in response to a signal from the coordinate value detecting means.

24. A work position adjusting apparatus for adjusting a position of a work having first in second surfaces in crossing planes, based upon mutually perpendicular first, second and third axes of a machine tool, the adjusting with respect to a relative motion between a tool head and a work table, the apparatus comprising:
a base;
a mounting member on which the work is mounted;
means supporting the mounting member on the base, the supporting means comprising first correcting means for correcting the inclination of the first surface, and second correcting means for rotating the mounting member around a predetermined axis to correcting the inclination of the second surface;
a frame defining a space; and
a moveable member connected to the mounting member, moveable relative to the frame in the space, wherein at least one of the first and second correcting means includes a pair of driving elements for driving the mounting member in opposite directions, the pair of driving elements disposed in the frame on opposite sides of the moveable member so that the moveable member is interposed therebetween, the driving elements displacing the frame relative to the moveable member so as to displace the mounting member relative to the base.

* * * * *